(12) United States Patent
Mizutani

(10) Patent No.: US 11,467,583 B2
(45) Date of Patent: Oct. 11, 2022

(54) STEERING FOR MARINE PROPULSION UNIT

(71) Applicants: YAMAHA HATSUDOKI KABUSHIKI KAISHA, Iwata (JP); MARINE CANADA ACQUISITION INC., Richmond (CA)

(72) Inventor: Makoto Mizutani, Shizuoka (JP)

(73) Assignees: YAMAHA HATSUDOKI KABUSHIKI KAISHA, Shizuoka (JP); MARINE CANADA ACQUISITION INC., Richmond (CA)

( * ) Notice: Subject to any disclaimer, the term of this patent is extended or adjusted under 35 U.S.C. 154(b) by 682 days.

(21) Appl. No.: 16/430,471

(22) Filed: Jun. 4, 2019

(65) Prior Publication Data

US 2019/0377347 A1  Dec. 12, 2019

(30) Foreign Application Priority Data

Jun. 8, 2018 (JP) .............................. JP2018-110450

(51) Int. Cl.
| | | |
|---|---|---|
| *B60L 3/00* | (2019.01) | |
| *B60L 15/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *G05D 1/02* | (2020.01) | |

(Continued)

(52) U.S. Cl.
CPC ........... *G05D 1/0206* (2013.01); *B63H 20/12* (2013.01); *F16H 25/20* (2013.01); *F16H 2025/2043* (2013.01); *F16H 2025/2078* (2013.01)

(58) Field of Classification Search
CPC ...... G05D 1/0206; B63H 20/12; F16H 25/20; F16H 2025/2043; F16H 2025/2078
USPC ............................................................ 701/21
See application file for complete search history.

(56) References Cited

U.S. PATENT DOCUMENTS

| | | | |
|---|---|---|---|
| 9,359,057 B1 | 6/2016 | Andrasko et al. | |
| 2008/0108256 A1* | 5/2008 | Mizutani | B63H 20/12 440/1 |
| 2008/0115711 A1 | 5/2008 | Mizutani | |

(Continued)

FOREIGN PATENT DOCUMENTS

| | | |
|---|---|---|
| CN | 206107526 U | 4/2017 |
| EP | 0 190 678 A1 | 8/1986 |

(Continued)

OTHER PUBLICATIONS

Official Communication issued in corresponding European Patent Application No. 19178824.9, dated Jun. 30, 2022.

*Primary Examiner* — Mahmoud S Ismail
(74) *Attorney, Agent, or Firm* — Keating and Bennett, LLP

(57) ABSTRACT

A steering for a marine propulsion unit adjusts at least one of a required steering speed and a required steering torque such that the required steering speed and the required steering torque fall within an output region when the required steering speed and the required steering torque are outside the output region, sets a target steering angle according to the adjusted required steering speed and required steering torque, and sets the target steering angle according to a rotation angle of a steering wheel when the required steering speed and the required steering torque are within the output region.

10 Claims, 13 Drawing Sheets

(51) Int. Cl.
*B63H 20/12* (2006.01)
*F16H 25/20* (2006.01)

(56) References Cited

U.S. PATENT DOCUMENTS

| | | | | |
|---|---|---|---|---|
| 2008/0115713 A1* | 5/2008 | Mizutani | ............... | B63H 20/12 440/53 |
| 2008/0119974 A1* | 5/2008 | Mizutani | ............... | B63H 25/24 440/53 |
| 2008/0125925 A1* | 5/2008 | Mizutani | ............... | B63H 25/02 701/21 |
| 2008/0210148 A1 | 9/2008 | Mizutani | | |
| 2009/0117788 A1* | 5/2009 | Kaji | ............... | B63H 20/12 345/173 |
| 2014/0329422 A1 | 11/2014 | Ito | | |
| 2020/0115012 A1* | 4/2020 | Orivuori | ............... | B63B 39/08 |

FOREIGN PATENT DOCUMENTS

| | | |
|---|---|---|
| JP | 61-178262 A | 8/1986 |
| JP | 04-349094 A | 12/1992 |
| JP | 2008-094369 A | 4/2008 |
| JP | 2008-126771 A | 6/2008 |
| JP | 2008-126772 A | 6/2008 |
| JP | 2008-126773 A | 6/2008 |
| JP | 2008-126774 A | 6/2008 |
| JP | 2008-126777 A | 6/2008 |
| JP | 2009-006997 A | 1/2009 |
| JP | 2012-101795 A | 5/2012 |
| JP | 2013-163439 A | 8/2013 |

\* cited by examiner

WHEN ADJUSTMENT IS NOT NECESSARY (REQUIRED STEERING SPEED AND REQUIRED STEERING TORQUE ARE WITHIN OUTPUT REGION)

WHEN ADJUSTMENT IS NOT NECESSARY (REQUIRED STEERING SPEED AND REQUIRED STEERING TORQUE ARE WITHIN OUTPUT REGION)

PERFORMANCE MAP SETTING CONTROL FLOW (MODIFIED PREFERRED EMBODIMENT)

STEERING FOR MARINE PROPULSION UNIT

CROSS REFERENCE TO RELATED APPLICATIONS

This application claims the benefit of priority to Japanese Patent Application No. 2018-110450 filed on Jun. 8, 2018. The entire contents of this application are hereby incorporated herein by reference.

BACKGROUND OF THE INVENTION

1. Field of the Invention

The present invention relates to a steering for a marine propulsion unit.

2. Description of the Related Art

A steering for a marine propulsion unit is known in general. Such a steering for a marine propulsion unit is disclosed in Japanese Patent Laid-Open No. 2008-126773, for example.

Japanese Patent Laid-Open No. 2008-126773 discloses a steering for a marine vessel including an ECU that includes a steering status detection means, a running status detection means, a marine propulsion unit status recognition means, and a an electric motor status detection means. The steering status detection means detects the steering status corresponding to an operator's steering wheel operation. The running status detection means detects the running status of the marine vessel. The marine propulsion unit status recognition means confirms the status such as the number of mounted outboard motors. The electric motor status detection means detects the status of an electric motor. The ECU of the steering for the marine vessel disclosed in Japanese Patent Laid-Open No. 2008-126773 further includes a rudder deflection angle control means that performs control of reducing a rudder deflection angle limit (steering angle limit) when determining, based on the detection values from the aforementioned four means, that the load on the electric motor during rudder deflection increases. Thus, the output exceeding the limit of the motor characteristics of the electric motor is significantly reduced or prevented, and hence an excessive increase in the load on the electric motor is significantly reduced or prevented.

In the steering for the marine vessel disclosed in Japanese Patent Laid-Open No. 2008-126773, control of reducing a rudder deflection angle limit, which is the upper limit of the rudder deflection angle, is performed when it is determined, based on the detection values from the aforementioned four means, that the load on the electric motor during rudder deflection increases. Thus, the marine vessel can only conceivably turn within a more limited range than its actual steerable range, and the steerable range cannot conceivably be fully utilized. Therefore, the turning radius of the marine vessel increases. Thus, a steering for a marine propulsion unit that fully utilizes its steerable range while significantly reducing or preventing an excessive increase in the load on an electric actuator is desired.

SUMMARY OF THE INVENTION

Preferred embodiments of the present invention provide steerings for marine propulsion units that each fully utilizes its steerable range while significantly reducing or preventing an excessive increase in the load on an electric actuator.

A steering for a marine propulsion unit according to a preferred embodiment of the present invention includes an electric actuator that changes a direction of a thrust force of the marine propulsion unit, a storage that stores an output region that is set based on a steering speed and a steering torque provided by the electric actuator, and a controller configured or programmed to acquire a required steering speed and a required steering torque according to a rotation angle of a steering wheel, to adjust at least one of the required steering speed and the required steering torque such that the required steering speed and the required steering torque fall within the output region when the required steering speed and the required steering torque are outside the output region, to set a target steering angle according to the adjusted required steering speed and required steering torque, to set the target steering angle according to the rotation angle of the steering wheel when the acquired required steering speed and required steering torque are within the output region, and to drive and control the electric actuator according to the set target steering angle.

A steering for a marine propulsion unit according to a preferred embodiment of the present invention includes the controller configured or programmed to acquire the required steering speed and the required steering torque according to the rotation angle of the steering wheel, to adjust at least one of the required steering speed and the required steering torque such that the required steering speed and the required steering torque fall within the output region when the acquired required steering speed and required steering torque are outside the output region, to set the target steering angle according to the adjusted required steering speed and the required steering torque, and to drive and control the electric actuator according to the set target steering angle. Thus, when the required steering speed and the required steering torque are outside the output region, the target steering angle is set according to the required steering speed and the required steering torque adjusted to be within the output region such that the load on the electric actuator is reduced. Consequently, an excessive increase in the load on the electric actuator is significantly reduced or prevented. Furthermore, unlike the case in which the controller is configured or programmed to perform a control of reducing a steering angle limit, the controller sets the target steering angle according to the adjusted required steering speed and required steering torque every time the controller acquires the required steering speed and the required steering torque according to the rotation angle of the steering wheel. Thus, the target steering angle is updated as needed according to the rotation angle of the steering wheel. Consequently, the target steering angle continues to be appropriately set such that the steerable range of the steering for the marine propulsion unit is fully utilized. Furthermore, the controller is configured or programmed to set the target steering angle according to the rotation angle of the steering wheel when the acquired required steering speed and required steering torque are within the output region, and to drive and control the electric actuator according to the set target steering angle. Thus, when it is not necessary to reduce the load on the electric actuator, the target steering angle is set according to the rotation angle of the steering wheel such that the steerability of the steering for the marine propulsion unit is sufficiently exerted as compared with the case in which the target steering angle is set according to the adjusted required steering speed and required steering torque.

In a steering for a marine propulsion unit according to a preferred embodiment of the present invention, the controller is preferably configured or programmed not to adjust the required steering torque but to adjust the required steering speed such that the required steering speed and the required steering torque fall within the output region. Accordingly, the required steering speed, which is the rate of change of the steering angle, is adjusted such that the target steering angle is more appropriately set as compared with the case in which the required steering torque is adjusted. Consequently, the electric actuator is properly driven and controlled.

In this case, the controller is preferably configured or programmed to adjust both the required steering speed and the required steering torque when the required steering speed and the required steering torque do not fall within the output region even when the required steering speed is adjusted. Accordingly, the required steering speed and the required steering torque are more reliably adjusted to fall within the output region.

In a steering for a marine propulsion unit according to a preferred embodiment of the present invention, the storage preferably stores a map showing the output region set based on the steering speed and the steering torque provided by the electric actuator. Accordingly, the controller easily adjusts at least one of the required steering speed and the required steering torque by referring to the map without performing complicated calculations. Consequently, the load on the controller is reduced.

In this case, the storage preferably stores a plurality of the maps in which the output regions are different from each other, and the controller is preferably configured or programmed to select the map according to an available current of the electric actuator. Accordingly, the controller changes the map to be referenced according to the available current of the electric actuator that influences the output of the electric actuator. Consequently, at least one of the required steering speed and the required steering torque is more accurately adjusted.

In a structure in which the map is selected according to the available current of the electric actuator, the plurality of maps preferably include a normal map and a correction map in which the output region is corrected such that a maximum value of the steering torque according to the steering speed is smaller than that in the normal map, and the controller is preferably configured or programmed to select the normal map when the available current of the electric actuator is not limited, and to select the correction map when the available current the electric actuator is limited. Accordingly, when the available current of the electric actuator is limited such that the output of the electric actuator is reduced, the controller uses the correction map in which the output region is corrected to be smaller such that the upper limit of the steering torque according to the steering speed is reduced. Consequently, the controller accurately adjusts at least one of the required steering speed and the required steering torque to match the status of the electric actuator.

In a steering for a marine propulsion unit according to a preferred embodiment of the present invention, the controller is preferably configured or programmed to update the output region based on an available current of the electric actuator. Accordingly, the controller updates the output region according to the available current of the electric actuator that influences the output of the electric actuator to accurately adjust at least one of the required steering speed and the required steering torque to match the status of the electric actuator.

In this case, the controller is preferably configured or programmed to limit the available current of the electric actuator and update the output region based on the limited available current when a temperature of the electric actuator is equal to or higher than a predetermined temperature. Accordingly, when it is necessary to limit the available current of the electric actuator in order to significantly reduce or prevent an increase in the temperature of the electric actuator, the controller updates the output region based on the limited available current. Consequently, the controller adjusts at least one of the required steering speed and the required steering torque while significantly reducing or preventing an increase in the temperature of the electric actuator.

In a steering for a marine propulsion unit according to a preferred embodiment of the present invention, the controller is preferably configured or programmed to update setting of the target steering angle at a predetermined time interval, and to update the setting of the target steering angle according to the adjusted required steering speed and required steering torque in a state in which a degree of increase of the target steering angle at the predetermined time interval is reduced when the acquired required steering speed and required steering torque are outside the output region. Accordingly, the degree of increase of the target steering angle is reduced according to the adjusted required steering speed and required steering torque such that a sharp increase in the target steering angle is significantly reduced or prevented. Consequently, an excessive increase in the load on the electric actuator is reliably significantly reduced or prevented.

In a steering for a marine propulsion unit according to a preferred embodiment of the present invention, the controller is preferably configured or programmed to set the target steering angle such that a degree of increase of the target steering angle is proportional to a degree of change of the rotation angle of the steering wheel when the acquired required steering speed and required steering torque are within the output region. Accordingly, the rotation of the steering wheel performed by a user is appropriately reflected in the target steering angle. Consequently, the steerability of a marine vessel is further enhanced.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel 100 including a steering 1 according to preferred embodiments of the present invention is now described with reference to FIG. 1. The steering 1 is an example of a "steering for a marine propulsion unit".

Figure 1:
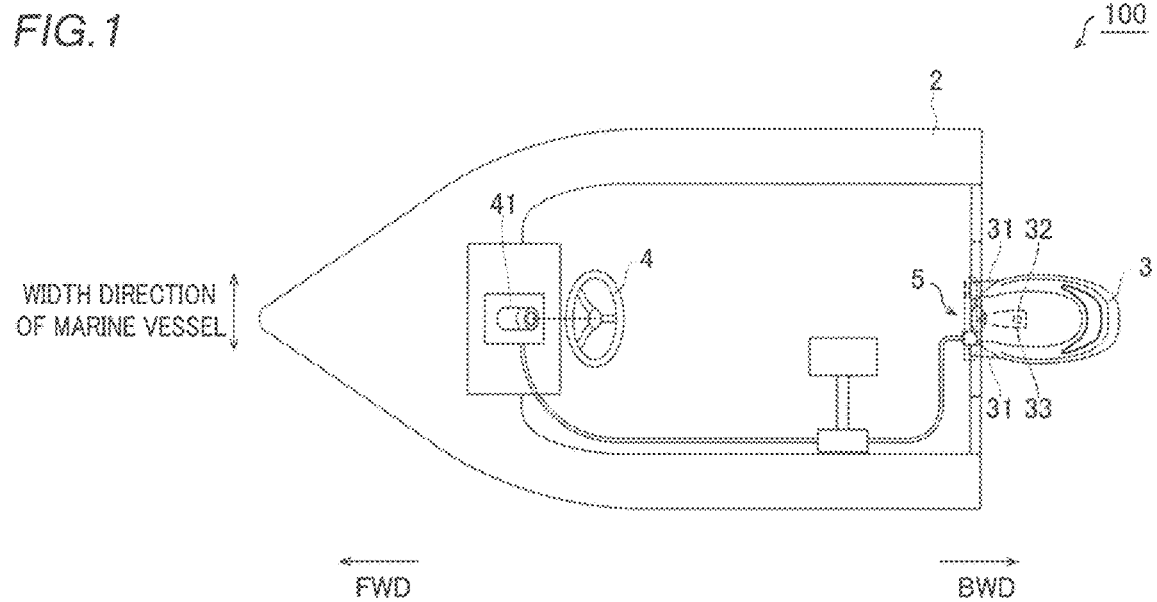
FIG. 1 is a plan view schematically showing a marine vessel including a steering according to a preferred embodiment of the present invention.

As shown in FIG. 1, the marine vessel 100 includes a vessel body 2, an outboard motor 3, and a steering wheel 4. The outboard motor 3 generates a thrust force to propel the marine vessel 100. The outboard motor 3 is connected to the stern of the vessel body 2 via a clamp bracket 31. The outboard motor 3 is rotatable about a swivel shaft 32 that extends in an upward-downward direction. A steering bracket 33 is mounted on an upper end of the swivel shaft 32. An electric steering section 5 is connected to the bow side (FWD side) of the steering bracket 33. The outboard motor 3 is an example of a "marine propulsion unit".

Figure 2:
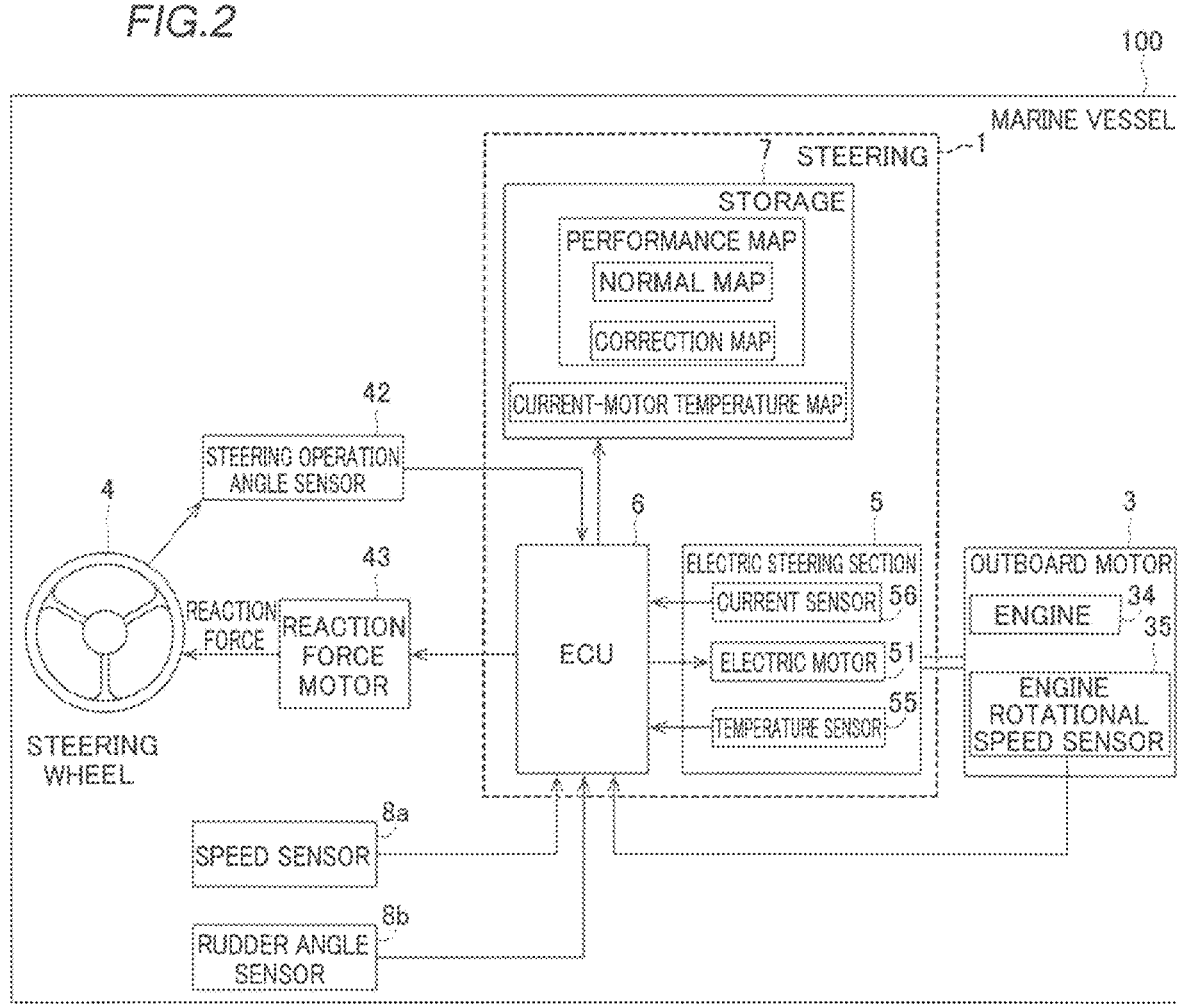
FIG. 2 is a block diagram showing a control structure of a marine vessel including a steering according to a preferred embodiment of the present invention.

As shown in FIG. 2, the outboard motor 3 includes an engine 34 that generates a propulsive force with a propeller (not shown) and an engine rotational speed sensor 35 that detects the rotational speed of the engine 34.

Figure 3:
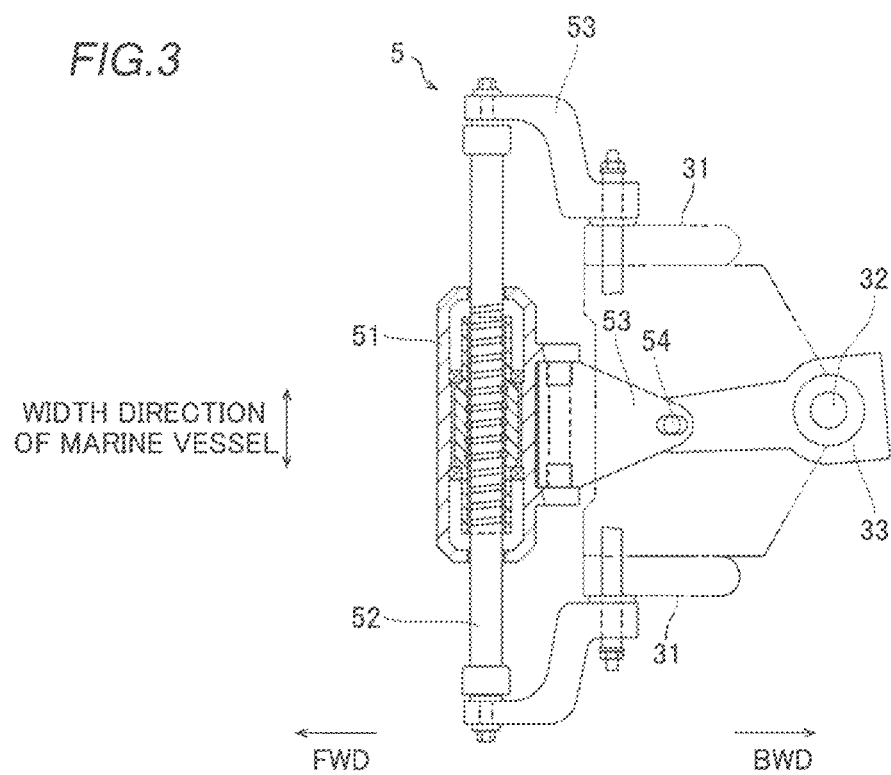
FIG. 3 is a plan view showing an electric steering section of a steering according to a preferred embodiment of the present invention.

As shown in FIG. 3, the electric steering section 5 includes an electric motor 51, a screw rod 52, a connecting bracket 53, and a connecting pin 54. The screw rod 52 extends in the width direction of the marine vessel and is fixed to the vessel body 2. The connecting bracket 53 extends from the electric motor 51 toward the stern (BWD side). The connecting pin 54 rotatably connects the connecting bracket 53 and the steering bracket 33. Thus, the electric motor 51 rotates and moves in the width direction of the marine vessel with respect to the screw rod 52 such that the outboard motor 3 (see FIG. 1) rotates about the swivel shaft 32 via the connecting bracket 53 and the steering bracket 33. Consequently, the direction of the thrust force of the outboard motor 3 is changed by the electric steering section 5, and the marine vessel 100 is steered. The electric steering section 5 is an example of an "electric actuator".

As shown in FIG. 2, the electric steering section 5 further includes a temperature sensor 55 and a current sensor 56. The temperature sensor 55 detects the motor temperature tm of the electric motor 51. The current sensor detects the magnitude (current I) of a current supplied to the electric motor 51.

The steering wheel 4 is rotated by a user. As shown in FIG. 1, the steering wheel 4 is fixed to a wheel shaft 41. As shown in FIG. 2, the wheel shaft 41 includes a steering operation angle sensor 42 and a reaction force motor 43. The steering operation angle sensor 42 detects the rotation angle (steering rotation angle) θh of the steering wheel 4. The reaction force motor 43 generates a reaction force in the steering wheel 4.

As shown in FIG. 2, the marine vessel 100 includes an ECU (engine control unit) 6 configured or programmed to control the entire marine vessel 100, a storage 7, a speed sensor 8a, and a rudder angle sensor 8b. The speed sensor 8a detects the moving speed of the marine vessel 100. The rudder angle sensor 8b detects an actual rudder angle, which is the actual turning angle of the marine vessel 100. The steering 1 includes the electric steering section 5, the ECU 6, and the storage 7. The ECU 6 is an example of a "controller".

The storage 7 includes memories such as a ROM and a RAM. The storage 7 stores various programs to be executed by the ECU 6. The storage 7 is used as a work area when the programs are executed by the ECU 6, for example.

Steering control of the marine vessel 100 is now described with reference to FIGS. 4 to 11.

Figure 4:
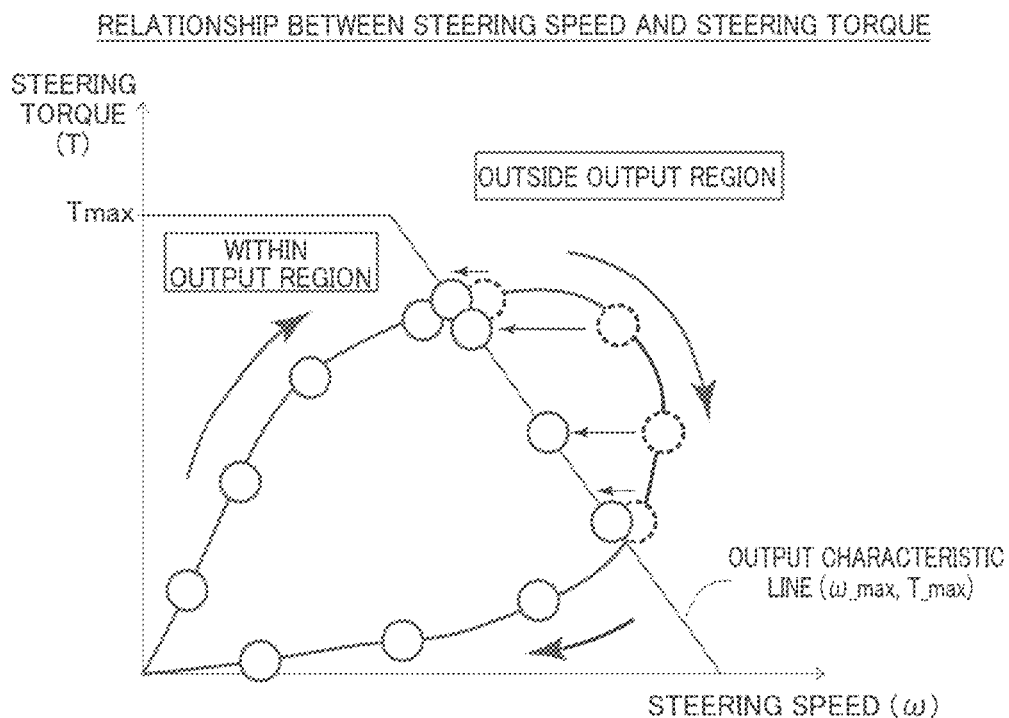
FIG. 4 is a diagram showing the relationship between the steering speed and the steering torque in a steering according to a preferred embodiment of the present invention.
Figure 5:
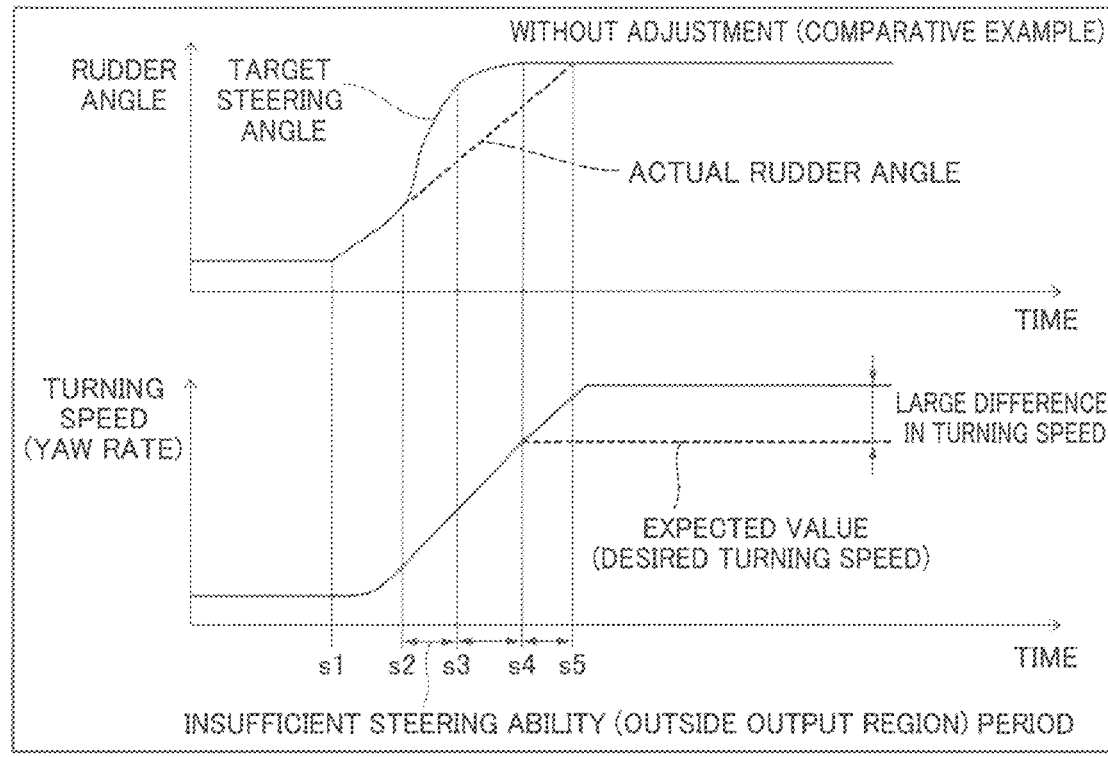
FIG. 5 is a diagram illustrating steering control in a comparative example of the present invention.

A current flows through the electric motor 51 of the electric steering section 5 during steering such that the electric motor 51 rotates at an arbitrary steering speed ω and an arbitrary steering torque T within an output region shown in FIG. 4. This output region is a region set based on the steering speed ω and the steering torque T according to the steering speed ω. In the output region, the boundary (output characteristic line) of the output region becomes the maximum value T_max of the steering torque T at a predetermined steering speed ω and becomes the maximum value ω_max of the steering speed ω at a predetermined steering torque T.

As general steering control of a marine vessel (comparative example), an ECU is configured or programmed to perform the following steering control. When a steering wheel is rotated, the ECU is configured or programmed to set the target steering angle of an outboard motor with respect to a vessel body. The ECU is configured or programmed to calculate a steering torque to be generated by an electric motor of an electric steering section based on an angular difference between the set target steering angle and the actual rudder angle of the vessel body. The ECU is configured or programmed to calculate the magnitude of a drive current to flow through the electric motor based on the calculated steering torque, and to cause the current to flow through the electric motor. At this time, the ECU is configured or programmed to perform control such that the drive current calculated by the duty control is generated. Consequently, the electric motor is driven to steer (turn) the marine vessel.

As shown in FIG. 4, even when the ECU is configured or programmed to set and calculate a steering speed and a steering torque outside the output region to rotate the electric motor, the electric motor does not rotate at the steering speed and the steering torque outside the output region, but rotates at a steering speed and a steering torque within the output region. Thus, a discrepancy occurs between the target steering angle and the actual rudder angle. Although only the steering speed is shown to decrease in FIG. 4, the steering torque may actually decrease. Consequently, when the steering wheel is quickly rotated by a user, for example, the ECU is configured or programmed to perform steering control of the marine vessel, as shown in a graph of FIG. 5.

When the user starts to rotate the steering wheel at a time s1, the steering control described above starts to be performed. When the user operates (rotates) the steering wheel at a high speed, the ECU is configured or programmed to set and calculate the steering speed and the steering torque such that the electric motor rotates at the steering speed and the steering torque outside the output region from a time s2. Thus, the electric motor cannot rotate until the target steering angle is reached, and steering ability becomes insufficient such that a discrepancy occurs between the target steering angle and the actual rudder angle. Thereafter, when the user slows down the operation of the steering wheel while experiencing the actual turning speed of the vessel body, the steering wheel is rotated such that the electric motor is able to rotate at the steering speed and the steering torque within the output region from a time s3. However, a discrepancy occurs between the target steering angle and the actual rudder angle in the insufficient steering ability period from the time s2 to the time s3, and thus the electric motor continues to rotate so as to resolve this discrepancy.

Even if the user stops rotating the steering wheel assuming that the desired turning speed of the vessel body has been reached at a time s4, the discrepancy between the target steering angle and the actual rudder angle has not been resolved yet, and thus the electric motor continues to rotate at the steering speed and the steering torque within the output region. In other words, a difference occurs between the steering angle according to the turning speed desired by the user and the target steering angle according to the steering wheel actually operated by the user, and thus even after the user stops rotating the steering wheel, the electric motor continues to be driven (rotate) toward the set target steering angle. Consequently, the turning speed is further increased until a time s5, and thus a difference between the turning speed expected by the user and the actually generated turning speed increases. Therefore, the user needs to rotate the steering wheel in a reverse direction in order to return the turning speed, which is too high, and the steerability of the marine vessel is reduced.

In the steering 1 for the marine vessel 100 according to a preferred embodiment of the present invention, the ECU 6 is configured or programmed to perform the following steering control. The ECU 6 is configured or programmed to acquire a required steering speed ωr and a required steering torque Tr according to the rotation angle (steering rotation angle) θh of the steering wheel 4. When the acquired required steering speed ωr and required steering torque Tr are outside the output region, the ECU 6 is configured or programmed to adjust at least one of the required steering speed ωr and the required steering torque Tr such that the required steering speed ωr and the required steering torque Tr fall within the output region, and to set a target steering angle θs according to the adjusted required steering speed ωr and required steering torque Tr. The ECU 6 is configured or programmed to drive and control the electric motor 51 of the electric steering section 5 according to the set target steering angle θs. This steering control is performed by the ECU 6 at each predetermined time interval S (about 20 milliseconds, for example).

Figure 6:
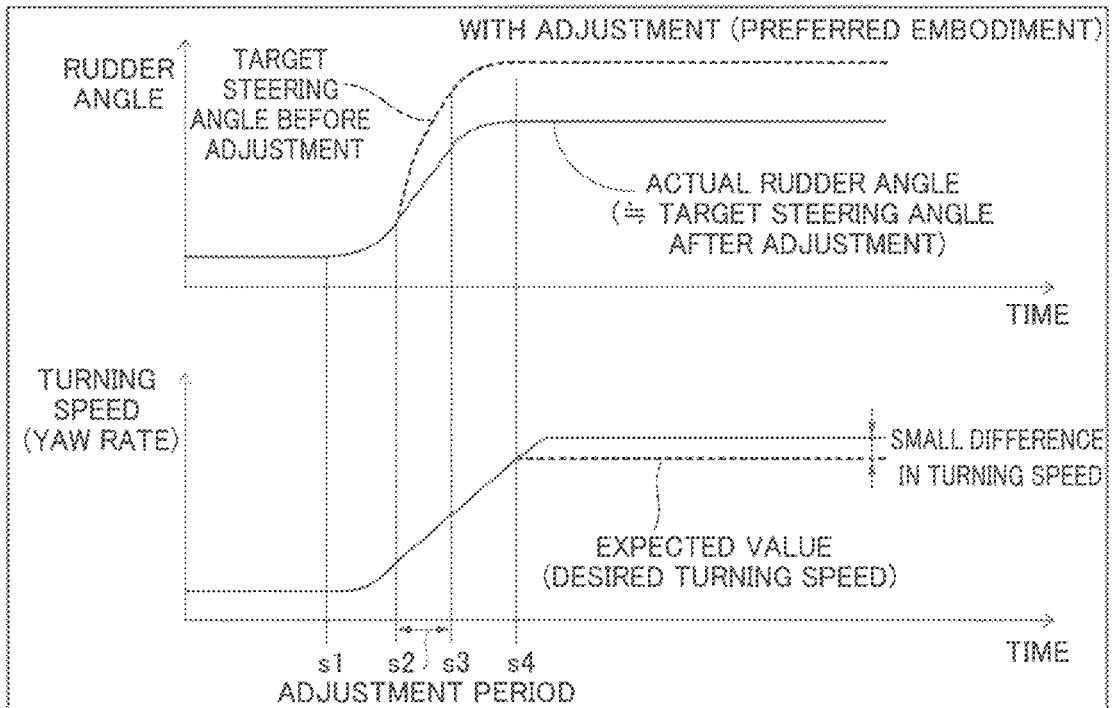
FIG. 6 is a diagram illustrating steering control performed by a steering according to a preferred embodiment of the present invention.

In such a structure, the ECU 6 is configured or programmed to perform steering control of the marine vessel 100, as shown in a graph of FIG. 6. When the user starts to rotate the steering wheel 4 at a time s1, the steering control described above starts to be performed by the ECU 6. Similarly to the comparative example, even when the user operates the steering wheel 4 at a high speed such that the acquired required steering speed ωr and required steering torque Tr are outside the output region from a time s2, the ECU 6 is configured or programmed to adjust at least one of the required steering speed ωr and the required steering torque Tr such that the required steering speed ωr and the required steering torque Tr fall within the output region, and to set the target steering angle θs according to the adjusted required steering speed ωr and required steering torque Tr. That is, the ECU 6 is configured or programmed to calculate and set a value of the target steering angle θs with respect to the user's operation of the steering wheel 4, which is lower than normal. Thus, the electric motor 51 of the electric steering section 5 is able to rotate until the adjusted target steering angle θs is reached, and thus during an adjustment period from the time s2 to a time s3, a discrepancy between the target steering angle θs and an actual rudder angle is significantly reduced or prevented.

Figure 7:
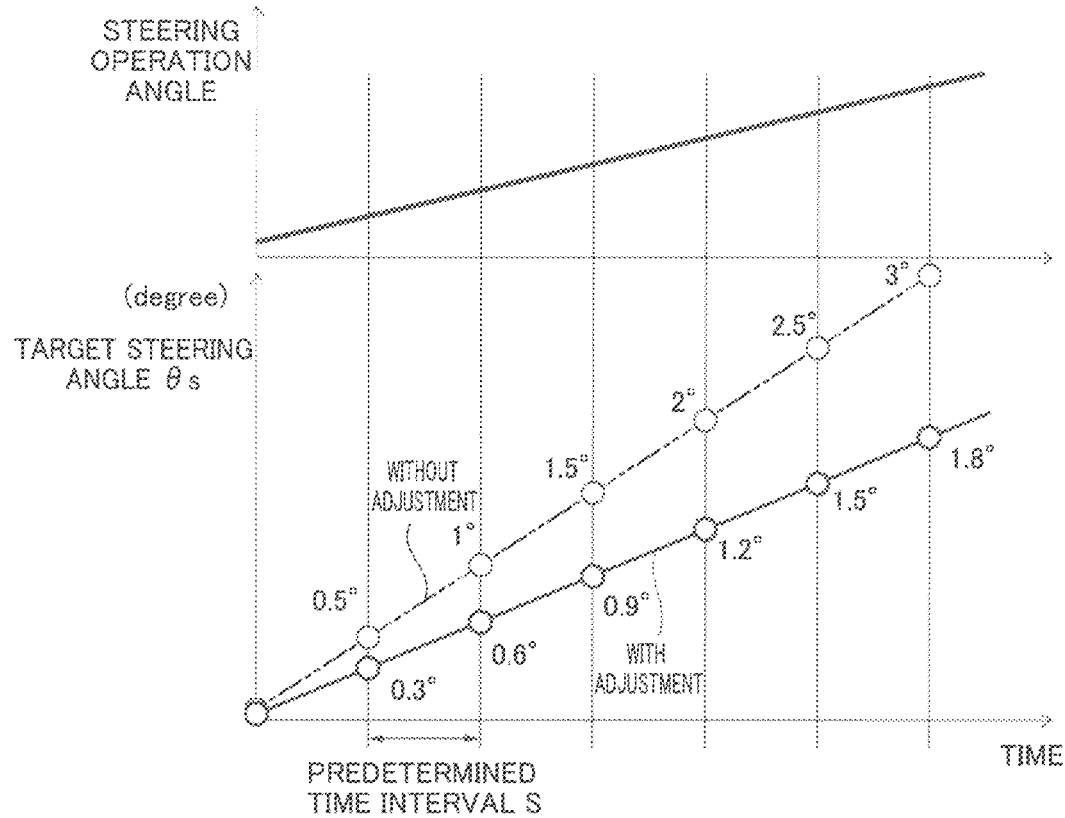
FIG. 7 is an enlarged view showing an example of steering control in an adjustment period in FIG. 6.

For example, in a state in which the degree of increase dθs of the target steering angle θs is further reduced when there is an adjustment as compared with when there is no adjustment, as in an example of the steering control in an adjustment period shown in FIG. 7, the setting of the target steering angle θs is updated at the predetermined time intervals S according to the adjusted required steering speed ωr and required steering torque Tr. In the example of FIG. 7, the degree of increase dθs of the target steering angle θs is reduced by 0.2 (=0.5−0.3) degrees at each predetermined time interval S.

As a result, as shown in FIG. 6, the discrepancy between the target steering angle θs and the actual rudder angle is significantly reduced or prevented even after the time s3. Therefore, when the user stops rotating the steering wheel 4 assuming that a desired turning speed has been reached at a time s4, the discrepancy between the target steering angle θs and the actual rudder angle is reduced, and thus rotation of the electric motor 51 is stopped at an early stage. Consequently, a difference between the turning speed expected by the user and the actually generated turning speed experienced by the user is reduced. Therefore, the steerability of the marine vessel 100 is enhanced.

The ECU 6 is configured or programmed to use a performance map (steering speed-steering torque map) stored in the storage 7 and showing the output region. Specifically, the ECU 6 is configured or programmed to use the performance map when determining whether or not the acquired required steering speed ωr and required steering torque Tr are outside the output region and when adjusting at least one of the required steering speed ωr and required steering torque Tr such that the required steering speed ωr and the required steering torque Tr fall within the output region.

When the acquired required steering speed ωr and required steering torque Tr are outside the output region, the ECU 6 is configured or programmed to adjust the required steering speed ωr such that the required steering speed ωr and the required steering torque Tr fall within the output region. On the other hand, when the required steering speed ωr and the required steering torque Tr do not fall within the output range even when the required steering speed ωr is adjusted, the ECU 6 may adjust both the required steering speed ωr and the required steering torque Tr.

Figure 8:
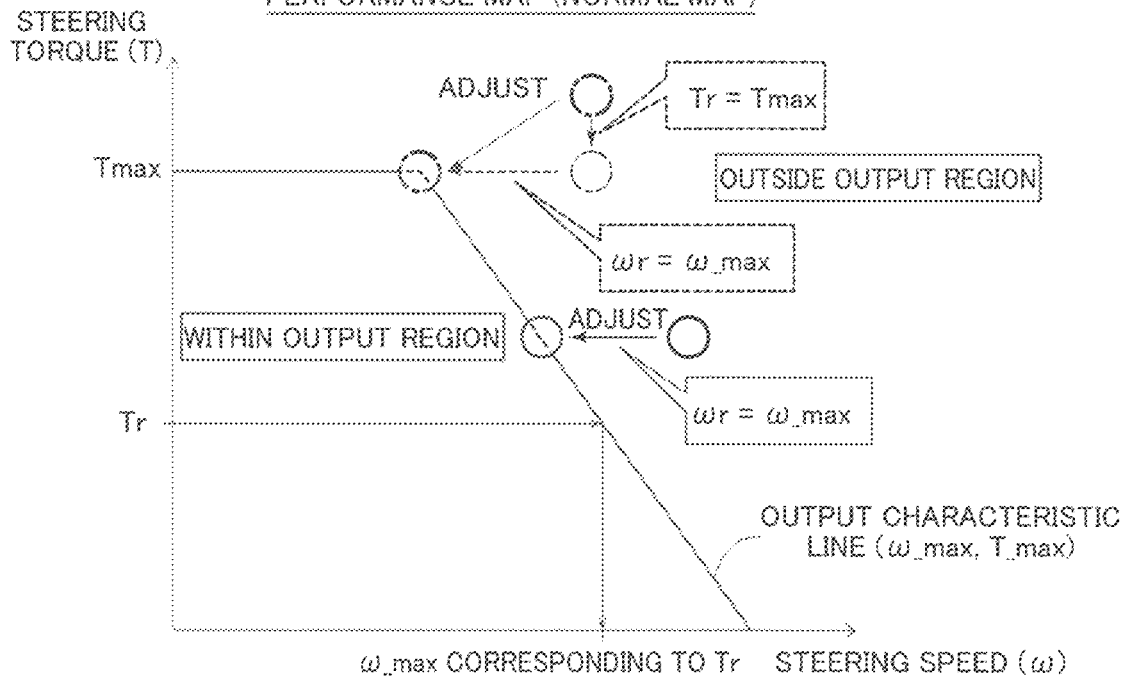
FIG. 8 is a view showing a normal map of a steering according to a preferred embodiment of the present invention.
Figure 9:
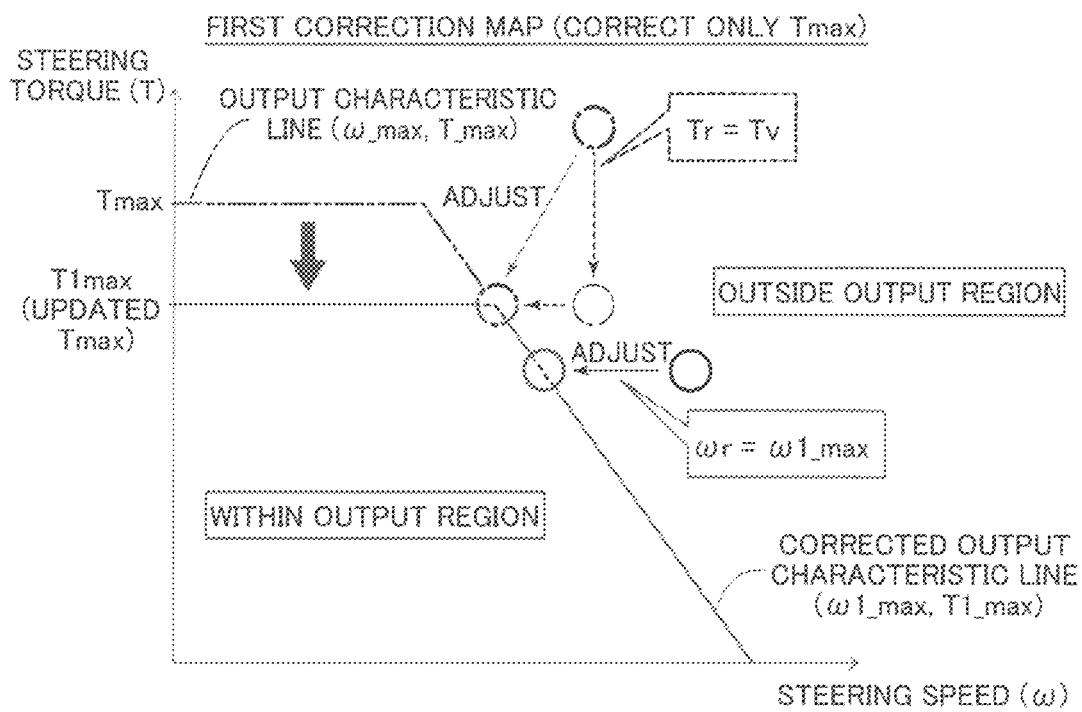
FIG. 9 is a diagram showing a first correction map of a steering according to a preferred embodiment of the present invention.

Specifically, when the required steering speed ωr and the required steering torque Tr are outside the output region and the required steering torque Tr is equal to or smaller than the maximum value Tmax of the steering torque T_max on the output characteristic line, as shown by a solid line in FIG. 8, the ECU 6 is configured or programmed to adjust the required steering speed ωr to be smaller. Thus, the required steering speed ωr and the required steering torque Tr fall within the output region. On the other hand, when the required steering speed ωr and the required steering torque Tr are outside the output region and the required steering torque Tr exceeds Tmax, as shown by a one-dot chain line in FIG. 8, the required steering speed ωr and the required steering torque Tr do not fall within the output region if only the required steering speed ωr is adjusted to be smaller. Thus, the ECU 6 is configured or programmed to first adjust the required steering torque Tr to Tmax, and thereafter adjust the required steering speed ωr to be smaller.

When the estimated motor temperature t of the electric motor 51 is equal to or higher than a predetermined temperature t0 (about 70° C., for example), the ECU 6 is configured or programmed to limit the available current I_max of the electric motor 51, and to update the output region of the steering speed ω and the steering torque T. Specifically, when not limiting the available current I_max of the electric motor 51, the ECU 6 is configured or programmed to use a normal map shown in FIG. 8 as the performance map. When limiting the available current I_max of the electric motor 51, the ECU 6 is configured or programmed to use first to third correction maps shown in FIGS. 9 to 11, in which the output regions are updated differently from the normal map, as the performance map. In other words, the ECU 6 is configured or programmed to select the performance map according to the available current I_max of the electric motor 51 of the electric steering section 5. The normal map and the first to third correction maps are stored in the storage 7.

In the first to third correction maps, the output regions are corrected such that the maximum value (upper limit) Tmax of the steering torque T_max on the output characteristic line is smaller than that in the normal map. Specifically, in the first correction map shown in FIG. 9, only the maximum value Tmax of the steering torque T_max on the output characteristic line is updated to be reduced to T_max and less than the value on the output characteristic line of the normal map. That is, when the first correction map is used, the required steering speed ωr is adjusted to the same small value as that in the normal map when the required steering speed ωr and the required steering torque Tr are outside the output region and the required steering torque Tr is equal to or smaller than T1max. On the other hand, when the required steering speed ωr and the required steering torque Tr are outside the output region and the required steering torque Tr exceeds T1max, the ECU 6 is configured or programmed to first adjust the required steering torque Tr to T1max, and thereafter adjust the required steering speed ωr to be smaller.

Figure 10:
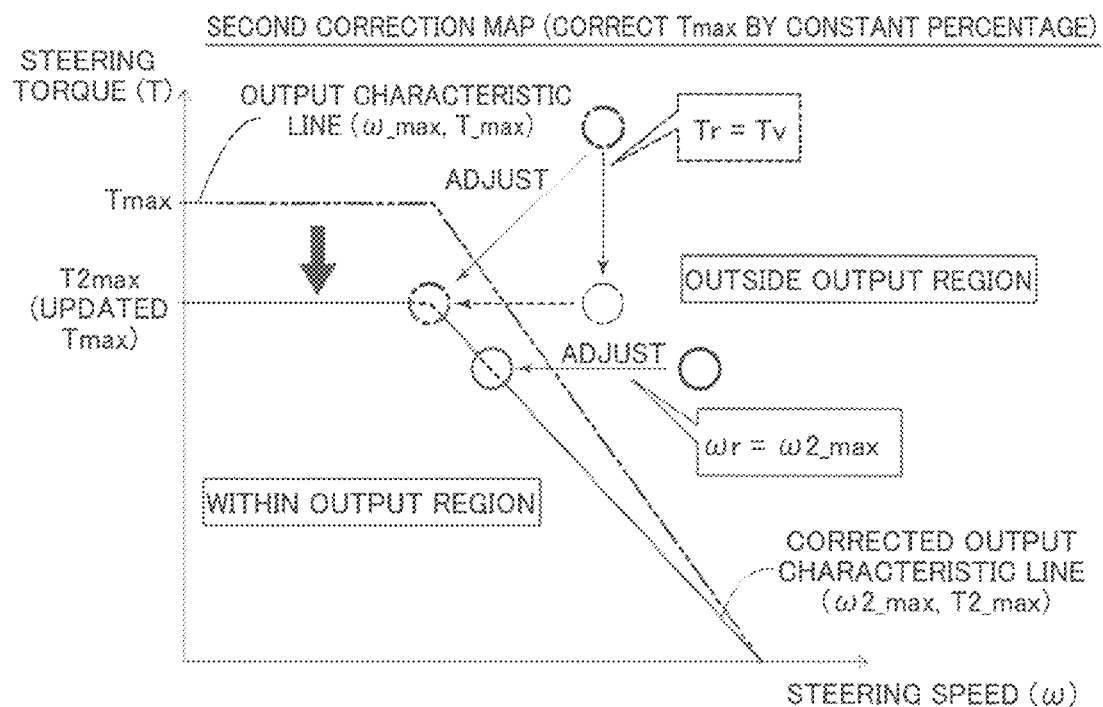
FIG. 10 is a diagram showing a second correction map of a steering according to a preferred embodiment of the present invention.

In the second correction map shown in FIG. 10, the steering torque T_max on the output characteristic line is updated to be uniformly smaller by a constant percentage than that on the output characteristic line of the normal map. For example, the steering torques T2_max and T2max on the updated output characteristic line are about 0.8 times, for example, the steering torques T_max and Tmax on the output characteristic line before updating, respectively. Consequently, when the second correction map is used, the required steering speed ωr is adjusted to be smaller as compared with the case in which the first correction map is used when the required steering speed ωr and the required steering torque Tr are outside the output region and the required steering torque Tr is the same. When the required steering torque Tr is smaller, the adjustment amount of the required steering speed ωr is smaller as compared with the case in which the required steering torque is larger.

Figure 11:
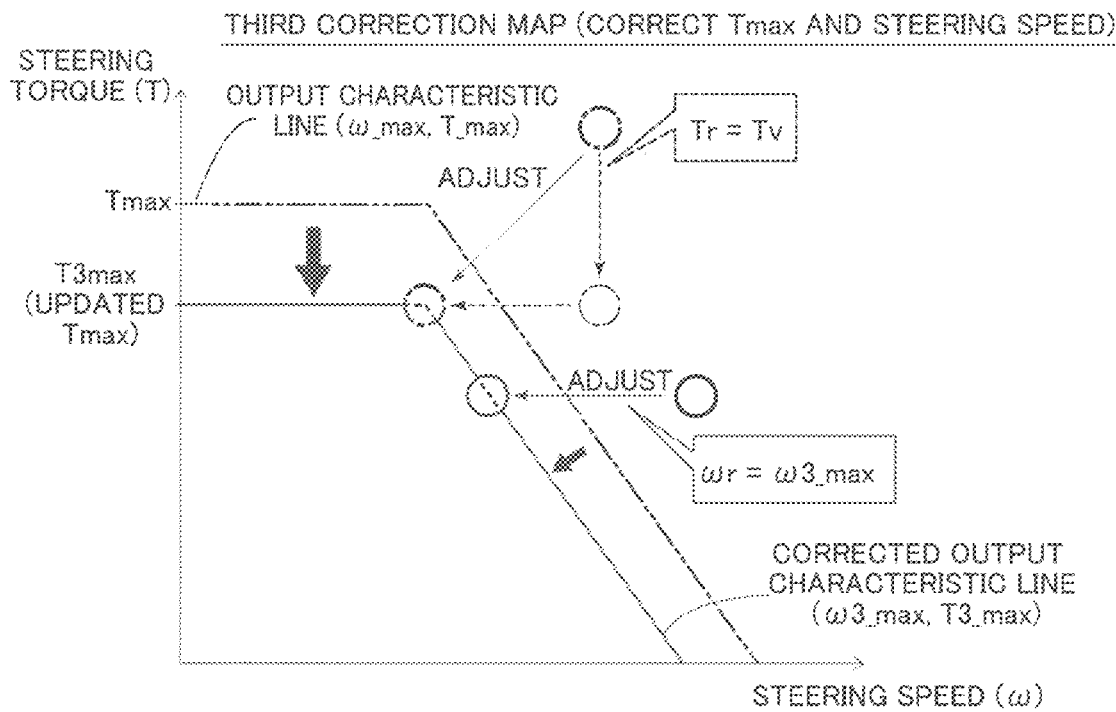
FIG. 11 is a diagram showing a third correction map of a steering according to a preferred embodiment of the present invention.

In the third correction map shown in FIG. 11, in addition to updating the maximum value Tmax of the steering torque T_max on the output characteristic line to be reduced to T3max and less than the value on the output characteristic line of the normal map, the steering speed ω_max on the output characteristic line is updated to be smaller by a certain amount. Consequently, when the third correction map is used, the required steering speed ωr is adjusted to be smaller as compared with the case in which the second correction map is used even when the required steering torque Tr is small. That is, the degrees of adjustment of the required steering speed ωr and the required steering torque Tr increase in the order of the first correction map, the second correction map, and the third correction map, and thus the available current I_max of the electric motor 51 decreases in this order. The first, second, or third correction map in which the available current I_max decreases is selected such that an increase in the temperature of the electric motor 51 is significantly reduced or prevented, and hence it is possible to significantly reduce or prevent occurrence of a failure in the electric motor 51 due to high heat.

Figure 12:
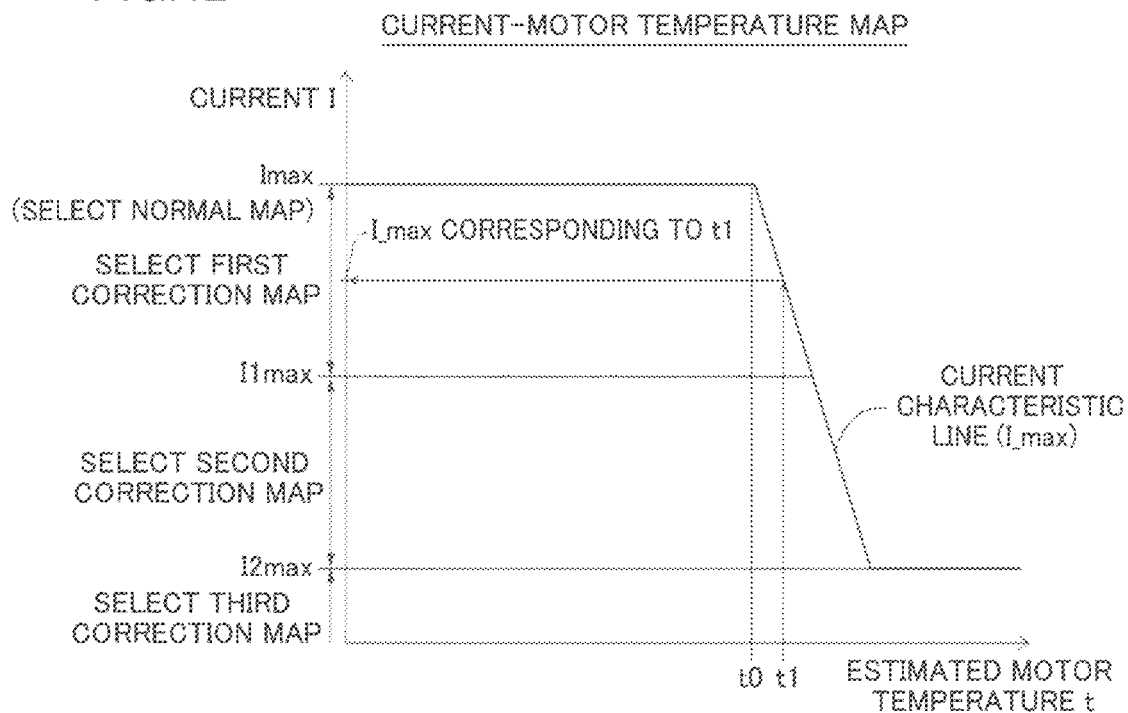
FIG. 12 is a diagram showing a current-motor temperature map of a steering according to a preferred embodiment of the present invention.

The ECU 6 is configured or programmed to select one of the first to third correction maps when the available current I_max of the electric motor 51 is limited. Specifically, the ECU 6 is configured or programmed to calculate the increased estimated motor temperature t based on the detection results from the temperature sensor 55 and the current sensor 56 of the electric steering section 5. The ECU 6 is configured or programmed to acquire the available current I_max from the estimated motor temperature t and a current-motor temperature map (see FIG. 12) stored in the storage 7. When the available current I_max of the electric motor 51 is equal to or more than a first current I1_max, the ECU 6 is configured or programmed to select the first correction map. When the available current I_max of the electric motor 51 is equal to or more than a second current I2_max and less than the first current I1_max, the ECU 6 is configured or programmed to select the second correction map. When the available current I_max of the electric motor 51 is less than the second current I2_max, the ECU 6 is configured or programmed to select the third correction map. The first current I1_max and the second current I2_max in FIG. 12 are examples.

When the acquired required steering speed ωr and required steering torque Tr are within the output region, the ECU 6 is configured or programmed to set the target steering angle θs such that the degree of increase dθs of the target steering angle θs is proportional to the degree of change dθh of the rotation angle (steering rotation angle) θh of the steering wheel 4. That is, when the required steering speed ωr and the required steering torque Tr are within the output region, the degree of increase (amount of change) dθs of the target steering angle θs is set by the ECU 6 to satisfy dθs=dθh×k1 in which k1 is a constant.

A steering control flow related to the steering control is now described with reference to FIGS. 13 to 15. The control of this control flow is continuously performed by the ECU 6 at the predetermined time intervals S.

Figure 13:
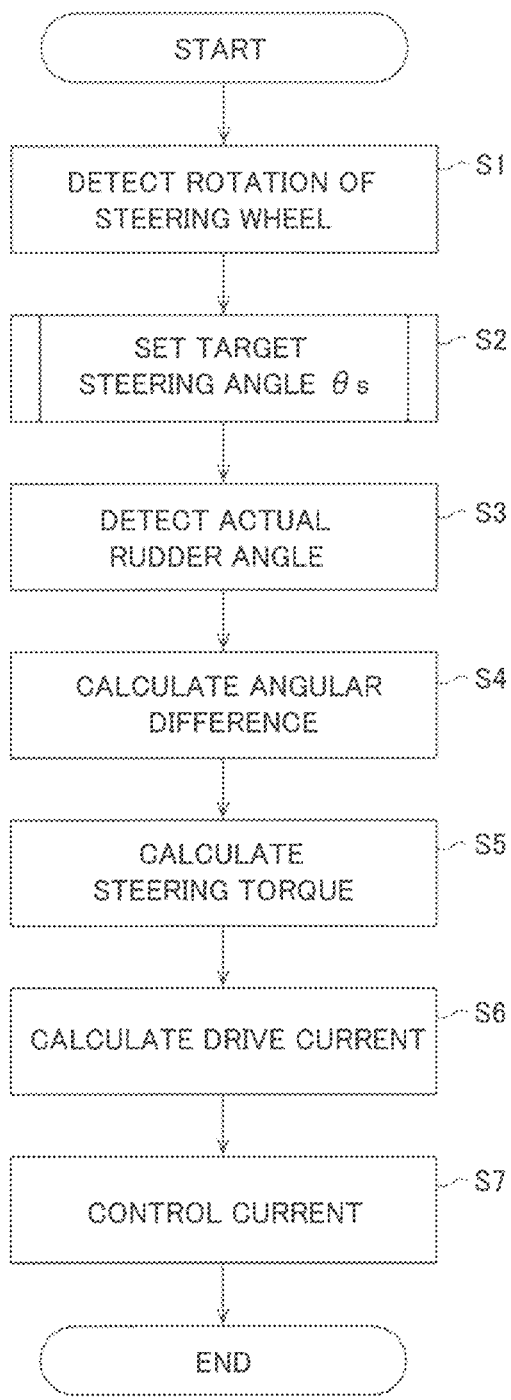
FIG. 13 is a flowchart showing a steering control flow according to a preferred embodiment of the present invention.

As shown in FIG. 13, when the steering operation angle sensor 42 detects that the steering wheel 4 is rotated in step S1, the ECU 6 sets the target steering angle θs as described below (target steering angle setting control flow shown in FIG. 14) in step S2. In step S3, the rudder angle sensor 8b detects the actual rudder angle. In step S4, the ECU 6 calculates an angular difference between the actual rudder angle and the target steering angle θs. In step S5, the ECU 6 performs PID control based on the angular difference between the actual rudder angle and the target steering angle θs and the status of the marine vessel 100 such as the engine rotational speed detected by the engine rotational speed sensor 35 or the moving speed of the marine vessel 100 detected by the speed sensor 8a, and calculates the steering torque T. At this time, when the required steering torque Tr is corrected to Tmax as described below, the steering torque T is calculated to be equal to or smaller than Tmax.

In step S6, the ECU 6 calculates a drive current by multiplying the steering torque T by a predetermined constant. In step S7, the ECU 6 controls the current to generate the drive current calculated by the duty control. Then, the ECU 6 terminates the steering control flow.

Figure 14:
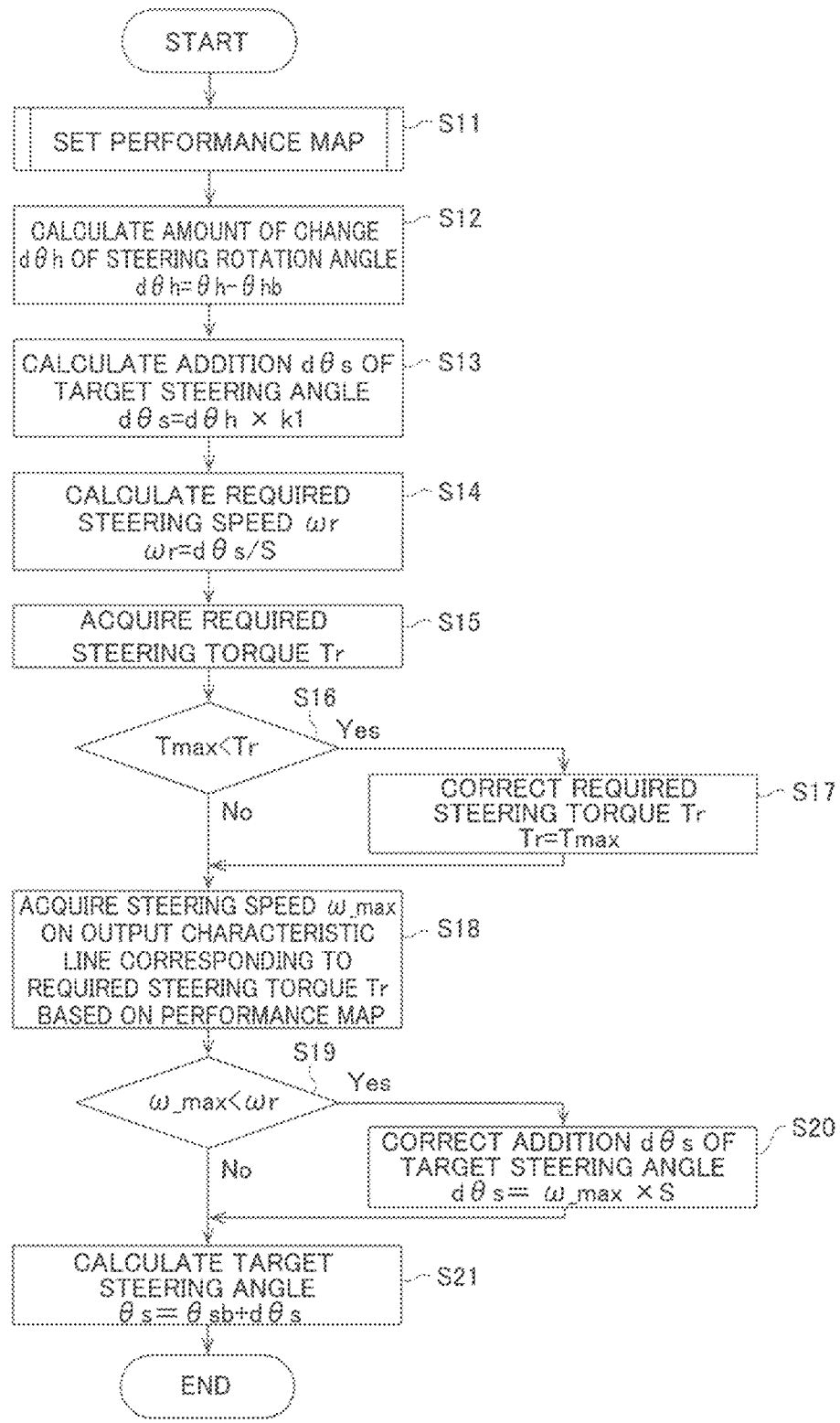
FIG. 14 is a flowchart showing a target steering angle setting control flow according to a preferred embodiment of the present invention.

In the target steering angle setting control flow shown in FIG. 14, the ECU 6 selects and sets the performance map (performance map setting control flow in FIG. 15) in step S11. In step S12, the ECU 6 calculates the amount of change dθh of the rotation angle (steering rotation angle) θh of the steering wheel 4. Specifically, the ECU 6 subtracts a steering rotation angle θhb at the time of the previous steering control stored in the storage 7 from the steering rotation angle θh detected by the steering operation angle sensor 42. Thus, the ECU 6 calculates the amount of change dθh (=θh−θhb) of the steering rotation angle θh. In step S13, the ECU 6 calculates an addition dθs of the target steering angle θs from the amount of change dθh of the steering rotation angle θh. Specifically, the ECU 6 calculates the addition (degree of increase) dθs (=dθh×k1) of the target steering angle θs by multiplying the amount of change dθh of the steering rotation angle θh by the predetermined constant k1.

In step S14, the ECU 6 calculates the required steering speed ωr (=dθs/S) by dividing the addition dθs of the target steering angle θs by the predetermined time interval S. In step S15, the ECU 6 acquires the required steering torque Tr. As a method for acquiring the required steering torque Tr, for example, the steering torque T calculated in step S5 (see FIG. 13) of the previous steering control may be estimated as the required steering torque Tr, or the required steering torque Tr may be estimated from the current by multiplying the current I of the current sensor 56 by a predetermined constant.

In step S16, the ECU 6 determines whether or not the required steering torque Tr is larger than the maximum value Tmax of the steering torque T. When the map selected in step S11 is the first, second, or third correction map, corresponding T1max, T2max, or T3max, which is the updated Tmax, is used as the maximum value Tmax of the steering torque T in step S16. When the required steering torque Tr is equal to or smaller than Tmax in step S16, the ECU 6 advances to step S18. When the required steering torque Tr is larger than Tmax in step S16, the required steering torque Tr is corrected to Tmax in step S17. Then, the ECU 6 advances to step S18.

In step S18, the ECU 6 acquires the steering speed ω_max on the output characteristic line according to the required steering torque Tr acquired or corrected in step S15 or S17 based on the performance map selected in step S11. For example, as shown in FIG. 8, an intersection between a predetermined Tr and the output characteristic line is acquired as the steering speed ω_max on the output characteristic line. In step S19, the ECU 6 determines whether or not the required steering speed ωr calculated in step S14 is larger than the steering speed ω_max on the output characteristic line acquired in step S18. When the required steering speed ωr is equal to or smaller than ω_max in step S19, the ECU 6 advances to step S21. When the required steering speed ωr is larger than ω_max in step S19, the ECU 6 corrects the addition dθs (=dθh×k1=ωr×S) of the target steering angle θs calculated in step S13 to dθs (=ω_max×S) in step S20. Then, the ECU 6 advances to step S21.

In step S21, the ECU 6 calculates the target steering angle θs using the addition dθs of the target steering angle θs calculated in step S13 or corrected in step S20. Specifically, the ECU 6 calculates and sets the target steering angle θs by adding the addition dθs of the target steering angle θs to the target steering angle θsb at the time of the previous steering control stored in the storage 7. Then, the ECU 6 terminates the target steering angle setting control flow, and advances to step S3 in FIG. 13.

Figure 15:
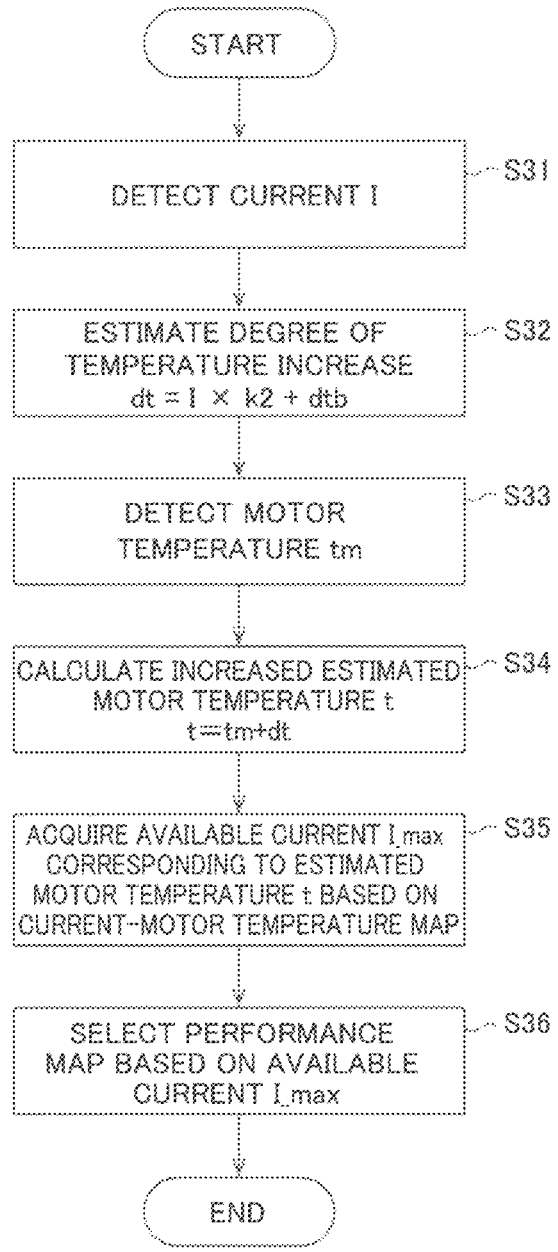
FIG. 15 is a flowchart showing a performance map setting control flow according to a preferred embodiment of the present invention.

In the performance map setting control flow shown in FIG. 15, the current sensor 56 of the electric steering section 5 detects the current I in step S31. In step S32, the ECU 6 estimates the degree of temperature increase dt of the electric motor 51 from the current I. Specifically, the ECU 6 adds the degree of temperature increase dtb at the time of the previous steering control stored in the storage 7 to a value obtained by multiplying the current I by a predetermined constant k2. Thus, the degree of temperature increase dt (=I×k2+dtb) of the electric motor 51 is calculated. In step S33, the temperature sensor 55 of the electric steering section 5 detects the actual temperature (motor temperature tm) of the electric motor 51. In step S34, the ECU 6 calculates the increased estimated motor temperature t (=tm+dt) of the electric motor 51 by adding the degree of temperature increase dt to the motor temperature tm.

In step S35, the ECU 6 acquires the available current I_max according to the estimated motor temperature t based on the current-motor temperature map. For example, as shown in FIG. 12, an intersection between a predetermined estimated motor temperature t1 and a current characteristic line is acquired as the available current I_max. In step S36, the ECU 6 selects one of the normal map in FIG. 8 and the first to third correction maps in FIGS. 9 to 11 as the performance map based on the acquired available current I_max. Then, the ECU 6 terminates the performance map setting control flow, and advances to step S12 in FIG. 14.

Figure 16:
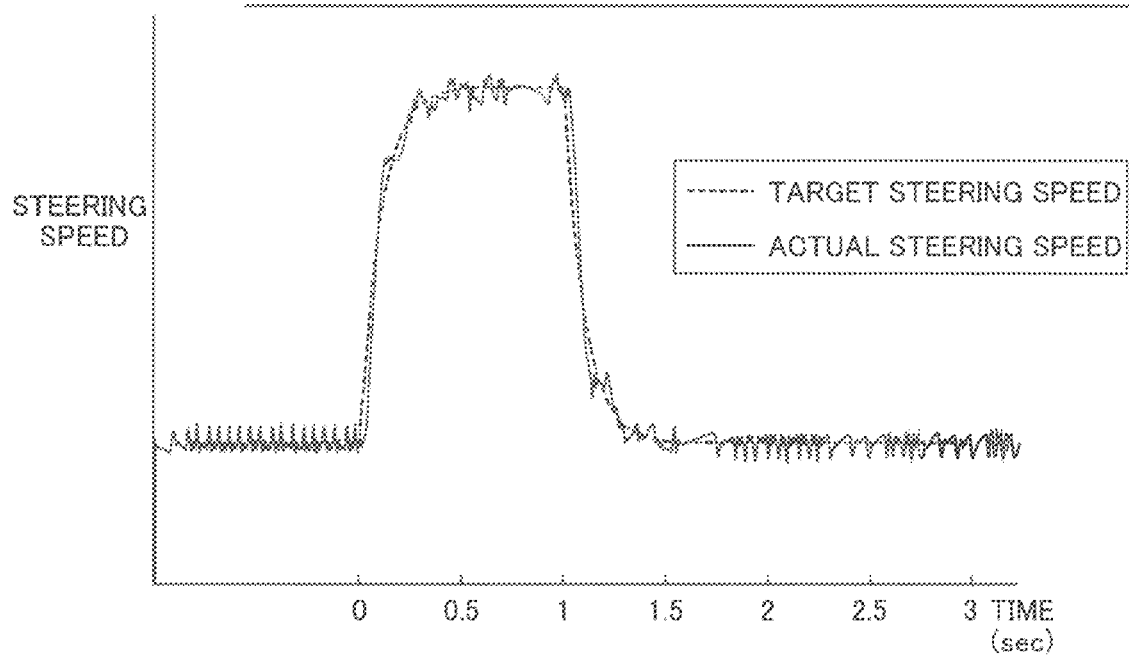
FIG. 16 is a graph showing a target steering speed and an actual steering speed of control results when adjustment is not necessary.
Figure 17:
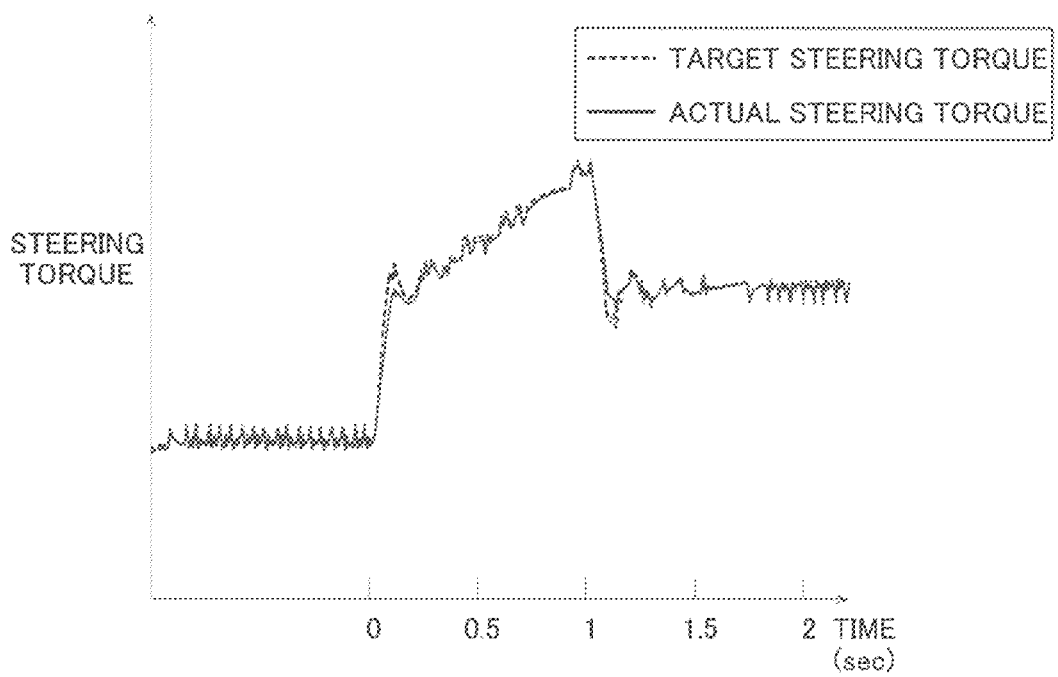
FIG. 17 is a graph showing a target steering torque and an actual steering torque of control results when adjustment is not necessary.
Figure 18:
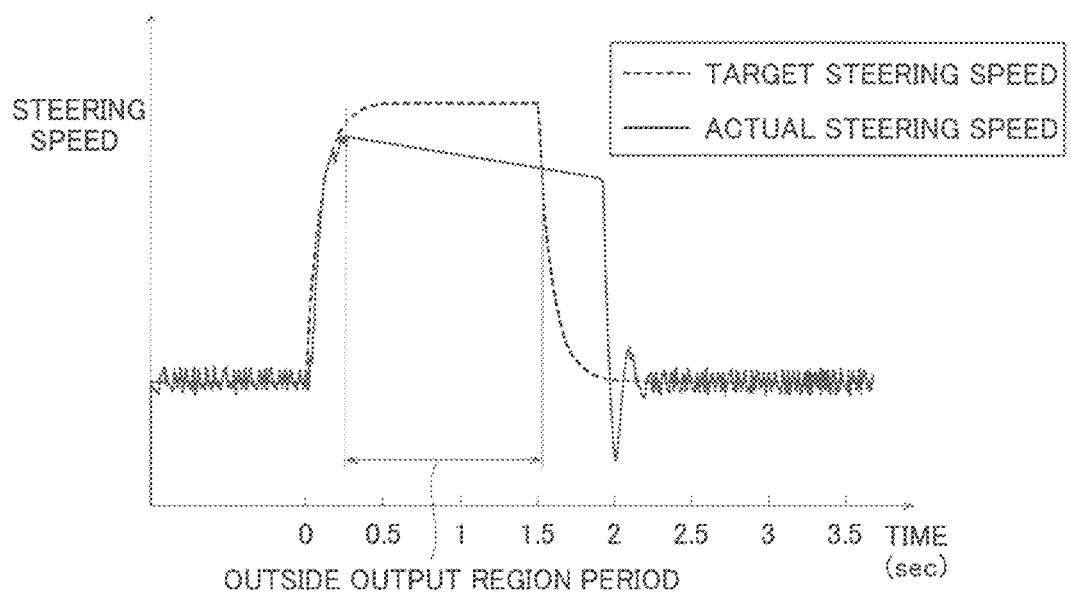
FIG. 18 is a graph showing a target steering speed and an actual steering speed of control results without adjustment.
Figure 19:
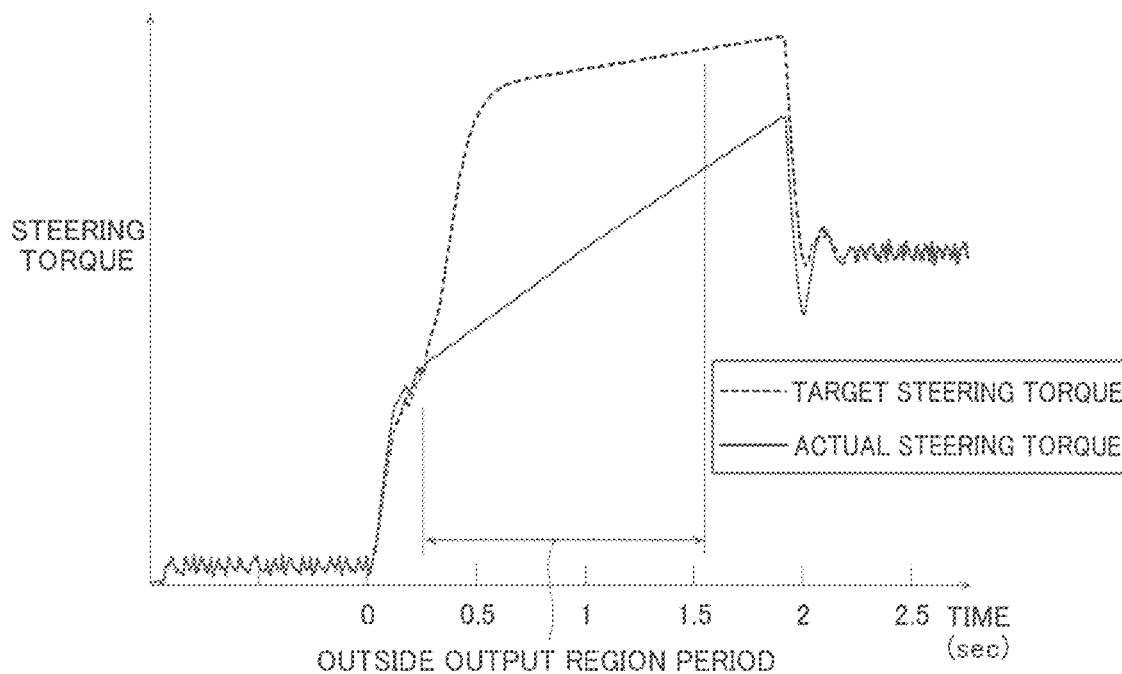
FIG. 19 is a graph showing a target steering torque and an actual steering torque of control results without adjustment.

FIGS. 16, 17, 20, and 21 show results obtained when the control has been performed based on the control flow described above. On the other hand, FIGS. 18 and 19 show, as comparative examples, results obtained when the control has not been performed based on the control flow described above. FIGS. 16 and 17 show the case in which the required steering speed and the required steering torque are within the output range of the electric motor of the electric steering section (when the adjustment is not necessary). In this case, both a difference between a target steering speed (a dotted line in FIG. 16) and an actual steering speed (a solid line in FIG. 16) and a difference between a target steering torque (a dotted line in FIG. 17) and an actual steering torque (a solid line in FIG. 17) hardly occurred.

FIGS. 18 and 19 show the case in which the required steering speed and the required steering torque are outside the output region of the electric motor of the electric steering section in a predetermined period (outside output region period) and the required steering speed and the required steering torque are not adjusted (without adjustment). In this case, both a difference between a target steering speed (a dotted line in FIG. 18) and an actual steering speed (a solid line in FIG. 18) and a difference between a target steering torque (a dotted line in FIG. 19) and an actual steering torque (a solid line in FIG. 19) clearly occurred. That is, when the required steering speed and the required steering torque are outside the output region of the electric motor of the electric steering section, the target steering speed and the target steering torque cannot be generated. Consequently, the difference between the turning speed expected by the user and the actually generated turning speed is increased, and the steerability of the marine vessel is reduced.

Figure 20:
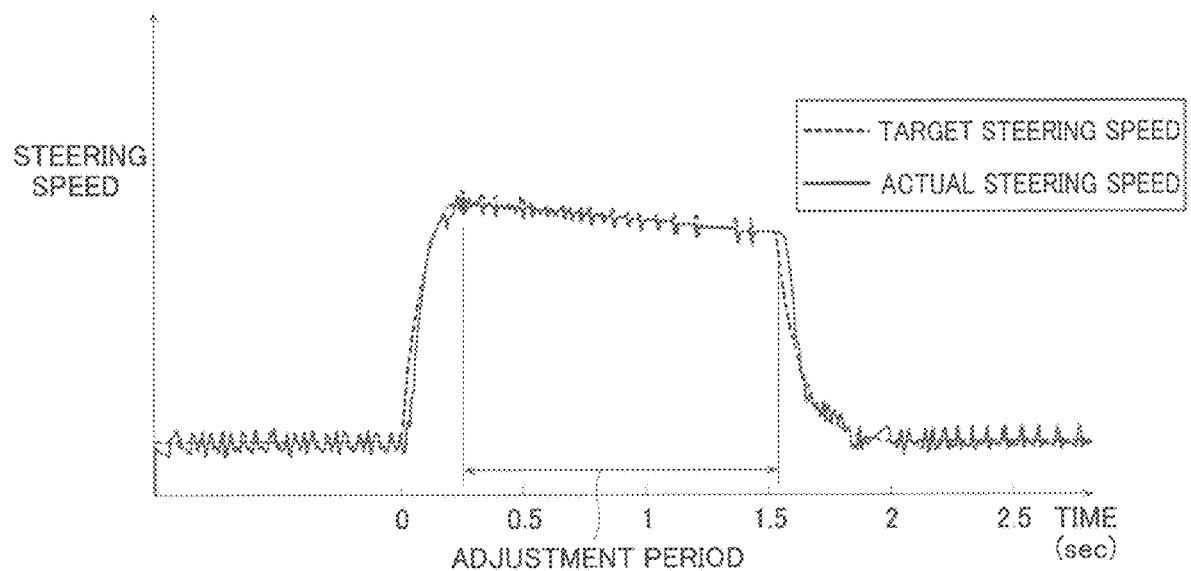
FIG. 20 is a graph showing a target steering speed and an actual steering speed of the control results with adjustment.
Figure 21:
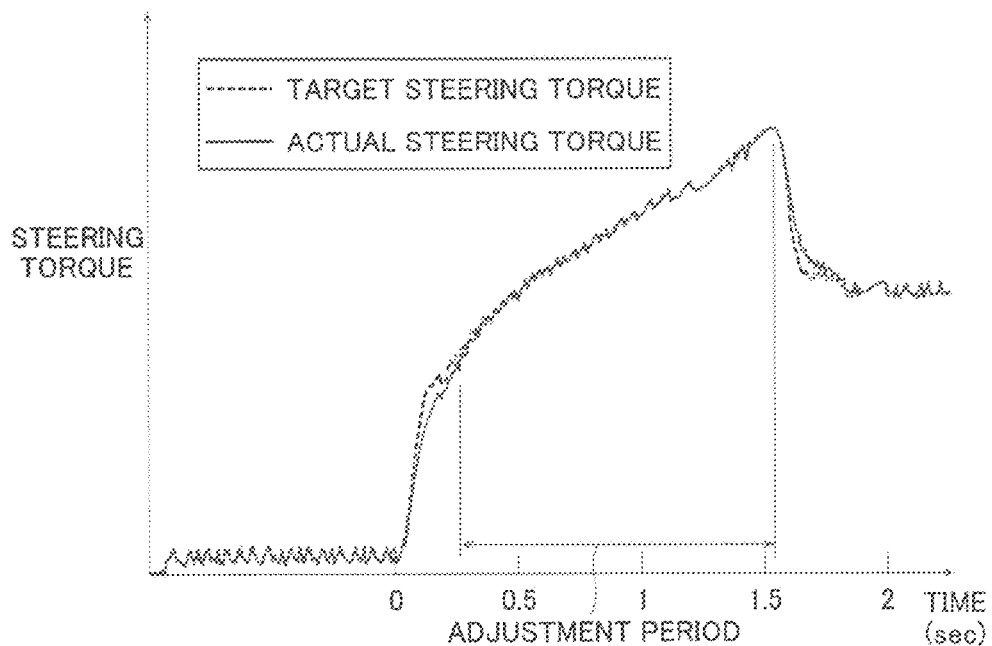
FIG. 21 is a graph showing a target steering torque and an actual steering torque of control results with adjustment.

FIGS. 20 and 21 show the case in which the required steering speed and the required steering torque outside the output region of the electric motor of the electric steering section are adjusted as in the preferred embodiments described above in a predetermined period (adjustment period) (with adjustment). In this case, both a difference between an adjusted target steering speed (a dotted line in FIG. 20) and an actual steering speed (a solid line in FIG. 20) and a difference between an adjusted target steering torque (a dotted line in FIG. 21) and an actual steering torque (a solid line in FIG. 21) hardly occurred. Thus, even when the required steering speed and the required steering torque are outside the output region of the electric motor of the electric steering section, the control is performed based on the control flow described above such that the adjusted target steering speed and the adjusted target steering torque is reliably generated similarly to the case in which the required steering speed and the required steering torque are within the output region as shown in FIGS. 16 and 17. Thus, a difference between the turning speed expected by the user and the actually generated turning speed is reduced, and a reduction in the steerability of the marine vessel is significantly reduced or prevented.

According to the various preferred embodiments of the present invention described above, the following advantageous effects are achieved.

According to a preferred embodiment of the present invention, the ECU 6 is configured or programmed to acquire the required steering speed ωr and the required steering torque Tr according to the rotation angle (steering rotation angle) θh of the steering wheel 4. When the acquired required steering speed ωr and required steering torque Tr are outside the output region, the ECU 6 is configured or programmed to adjust at least one of the required steering speed ωr and the required steering torque Tr such that the required steering speed ωr and the required steering torque Tr fall within the output region, and to set the target steering angle θs according to the adjusted required steering speed ωr and required steering torque Tr. Furthermore, the ECU 6 is configured or programmed to drive and control the electric motor 51 of the electric steering section 5 according to the set target steering angle θs. Thus, when the required steering speed ωr and the required steering torque Tr are outside the output region, the target steering angle θs is set according to the required steering speed ωr and the required steering torque Tr adjusted to be within the output region such that the load on the electric motor 51 of the electric steering section 5 is reduced. Consequently, an excessive increase in the load on the electric steering section 5 is significantly reduced or prevented. Furthermore, unlike the case in which the ECU 6 is configured or programmed to perform control of reducing a steering angle limit, the ECU 6 sets the target steering angle θs according to the adjusted required steering speed ωr and required steering torque Tr every time the ECU 6 acquires the required steering speed ωr and the required steering torque Tr according to the rotation angle of the steering wheel 4. Thus, the target steering angle θs is updated as needed according to the rotation angle of the steering wheel 4. Consequently, the target steering angle θs continues to be appropriately set such that the steerable range of the steering 1 is fully utilized.

According to a preferred embodiment of the present invention, the ECU 6 is configured or programmed to set the target steering angle θs according to the rotation angle of the steering wheel 4 when the acquired required steering speed ωr and required steering torque Tr are within the output region. The ECU 6 is configured or programmed to drive and control the electric steering section 5 according to the set target steering angle θs. Thus, when it is not necessary to reduce the load on the electric steering section 5, the target steering angle θs is set according to the rotation angle of the steering wheel 4 such that the steerability of the steering 1 is sufficiently exerted as compared with the case in which the target steering angle θs is set according to the adjusted required steering speed ωr and required steering torque Tr. Consequently, the steerability of the marine vessel 100 including the steering 1 is enhanced.

According to a preferred embodiment of the present invention, the ECU 6 is configured or programmed not to adjust the required steering torque Tr but to adjust the required steering speed ωr such that the required steering speed ωr and the required steering torque Tr fall within the output region. Thus, the required steering speed ωr, which is the rate of change of the steering angle, is adjusted such that the target steering angle θs is more appropriately set as compared with the case in which the required steering torque Tr is adjusted. Consequently, the electric steering section 5 is properly driven and controlled.

According to a preferred embodiment of the present invention, the ECU 6 is configured or programmed to adjust both the required steering speed ωr and the required steering torque Tr when the required steering speed ωr and the required steering torque Tr do not fall within the output region even when the required steering speed ωr is adjusted. Thus, the required steering speed ωr and the required steering torque Tr are more reliably adjusted to fall within the output region.

According to a preferred embodiment of the present invention, the map (performance map) showing the output region set based on the steering speed ω and the steering torque T provided by the electric steering section 5 is stored in the storage 7. Thus, the ECU 6 easily determines whether or not the required steering speed ωr and the required steering torque Tr are outside the output region and adjusts at least one of the required steering speed ωr and the required steering torque Tr by referring to the performance map without performing complicated calculations. Consequently, the load on the ECU 6 is reduced.

According to a preferred embodiment of the present invention, the ECU 6 is configured or programmed to select the performance map according to the available current I_max of the electric motor 51 of the electric steering section 5. Thus, the performance map to be referenced is changed according to the available current I_max of the electric motor 51 that influences the output of the electric motor 51. Consequently, at least one of the required steering speed $\omega r$ and the required steering torque Tr is more accurately adjusted.

According to a preferred embodiment of the present invention, the plurality of maps include the normal map and the first to third correction maps in which the output region is corrected such that the maximum value (upper limit) Tmax of the steering torque T according to the steering speed $\omega$ is smaller than that in the normal map. When the available current I_max of the electric motor 51 of the electric steering section 5 is not limited, the ECU 6 is configured or programmed to select the normal map. When the available current I_max of the electric motor 51 is limited, the ECU 6 is configured or programmed to select one of the first to third correction maps. Thus, when the available current I_max of the electric motor 51 is limited such that the output of the electric motor 51 of the electric steering section 5 is reduced, the ECU 6 uses the first to third correction maps in which the output region is corrected to be smaller such that Tmax is reduced. Consequently, the ECU 6 accurately adjusts at least one of the required steering speed $\omega r$ and the required steering torque Tr to match the status of the electric steering section 5.

According to a preferred embodiment of the present invention, the ECU 6 is configured or programmed to update the output region based on the available current I_max of the electric motor 51 of the electric steering section 5. Thus, the ECU 6 updates the output region according to the available current I_max of the electric motor 51 that influences the output of the electric steering section 5 to accurately adjust at least one of the required steering speed $\omega r$ and the required steering torque Tr to match the status of the electric steering section 5.

According to a preferred embodiment of the present invention, the ECU 6 is configured or programmed to limit the available current I_max of the electric motor 51 of the electric steering section 5 and update the output region based on the limited available current I_max when the estimated motor temperature t of the electric motor 51 of the electric steering section 5 is equal to or higher than the predetermined temperature t0. Thus, when it is necessary to limit the available current I_max of the electric steering section 5 in order to significantly reduce or prevent an increase in the temperature of the electric motor 51 of the electric steering section 5, the ECU 6 updates the output region based on the limited available current I_max. Consequently, the ECU 6 adjusts at least one of the required steering speed $\omega r$ and the required steering torque Tr while significantly reducing or preventing an increase in the temperature of the electric motor 51.

According to a preferred embodiment of the present invention, the ECU 6 is configured or programmed to update the setting of the target steering angle $\theta s$ at the predetermined time intervals. When the acquired required steering speed $\omega r$ and required steering torque Tr are outside the output region, the ECU 6 is configured or programmed to update the setting of the target steering angle $\theta s$ according to the adjusted required steering speed $\omega r$ and required steering torque Tr in a state in which the degree of increase $d\theta s$ of the target steering angle $\theta s$ at the predetermined time intervals is reduced. Thus, the degree of increase $d\theta s$ of the target steering angle $\theta s$ is reduced according to the adjusted required steering speed $\omega r$ and required steering torque Tr such that a sharp increase in the target steering angle $\theta s$ is significantly reduced or prevented. Consequently, an excessive increase in the load on the electric steering section 5 is reliably significantly reduced or prevented.

According to a preferred embodiment of the present invention, the ECU 6 is configured or programmed to set the target steering angle $\theta s$ such that the degree of increase $d\theta s$ of the target steering angle $\theta s$ is proportional to the steering rotation angle $\theta h$ when the acquired required steering speed $\omega r$ and required steering torque Tr are within the output region. Thus, the rotation of the steering wheel 4 performed by the user is appropriately reflected in the target steering angle $\theta s$. Consequently, the steerability of the marine vessel 100 is further enhanced.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the ECU 6 is preferably configured or programmed to determine whether or not the required steering speed and the required steering torque are outside the output region using the map showing the output region in preferred embodiments described above, the present invention is not restricted to this. The ECU may alternatively be configured or programmed to determine whether or not the required steering speed and the required steering torque are outside the output region without using the map. The ECU may alternatively be configured or programmed to determine whether or not the required steering speed and the required steering torque are outside the output region using a mathematical expression, for example.

While the four performance maps (the normal map and first to third correction maps) are preferably used as the map showing the output region in preferred embodiments described above, the present invention is not restricted to this. As the map showing the output region, only the normal map may alternatively be used, or the normal map and one, two, or four or more correction maps may alternatively be used.

Figure 22:
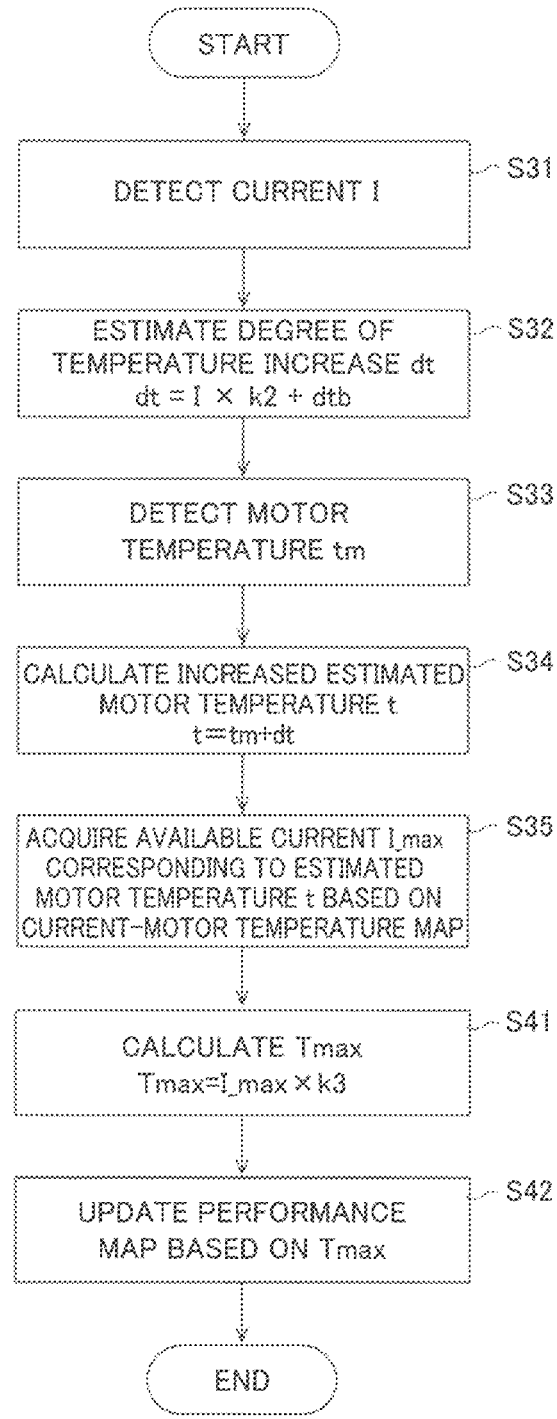
FIG. 22 is a flowchart showing a performance map setting control flow according to a modified preferred embodiment of the present invention.

While the ECU 6 is preferably configured or programmed to select and set one of the four performance maps stored in the storage 7 when the performance map setting control flow is performed in preferred embodiments described above, the present invention is not restricted to this. Each time the performance map setting control flow is performed, a performance map may alternatively be created and set. For example, a performance map setting control flow in a modified preferred embodiment shown in FIG. 22 may alternatively be performed by the ECU. In this performance map setting control flow according to the modified preferred embodiment, steps S31 to S35 in FIG. 15 are performed to acquire the available current I_max. In step S41, the available current I_max is multiplied by a predetermined constant k3 to calculate the maximum value Tmax of the steering torque T_max on the output characteristic line. In step S42, the performance map is updated based on the calculated Tmax. For example, the performance map is updated such that the maximum value Tmax of the steering torque T_max on the output characteristic line of the normal map is updated to Tmax calculated in step S41. Accordingly, the ECU adjusts at least one of the required steering speed and the required steering torque to further match the status of the electric actuator.

While the marine vessel 100 preferably includes one outboard motor 3 as a marine propulsion unit in preferred embodiments described above, the present invention is not restricted to this. The marine vessel may alternatively include a plurality of marine propulsion units. In this case, the marine vessel includes an electric steering section for each of the plurality of marine propulsion units. Furthermore, the ECU is configured or programmed to adjust at least one of the required steering speed and the required steering torque to be generated in each electric steering section.

While the electric motor 51 of the electric steering section 5 preferably rotates and moves in the width direction of the marine vessel relative to the screw rod 52 such that the outboard motor 3 rotates about the swivel shaft 32 in preferred embodiments described above, the present invention is not restricted to this. For example, the electric motor may alternatively control the pressure of a hydraulic pump such that the outboard motor rotates about the swivel shaft. In other words, the electric steering section need not necessarily be motorized, and may include a structure partially using oil pressure.

While the ECU 6 is preferably configured or programmed to adjust at least one of the required steering speed $\omega r$ and the required steering torque Tr such that the required steering speed $\omega r$ and the required steering torque Tr are located on the output characteristic line in preferred embodiments described above, the present invention is not restricted to this. The ECU may alternatively be configured or programmed to adjust at least one of the required steering speed and the required steering torque such that the required steering speed and the required steering torque are not located on the output characteristic line but are located within the output region inside the output characteristic line. From the viewpoint of responding to the user's rotating operation as much as possible, the ECU is preferably configured or programmed to adjust at least one of the required steering speed and the required steering torque such that the required steering speed and the required steering torque are located on the output characteristic line or within the output region in the vicinity of the output characteristic line as in the preferred embodiments described above.

While the ECU 6 is preferably configured or programmed to update the output region of the steering speed $\omega$ and the steering torque T when limiting the available current I_max of the electric motor 51 in preferred embodiments described above, the present invention is not restricted to this. In addition to updating the output region, the ECU may alternatively be configured or programmed to notify the user of a decrease in the steering ability of the marine vessel caused by the limited available current. In addition to updating the output region, the ECU may alternatively be configured or programmed to limit the engine rotational speed to a predetermined rotational speed or less, or may alternatively be configured or programmed to restrict rotation of the steering wheel (handle lock) in a wider angular range.

While the ECU 6 is preferably configured or programmed to limit the available current I_max of the electric motor 51 of the electric steering section 5 when the estimated motor temperature t of the electric motor 51 of the electric steering section 5 is equal to or higher than the predetermined temperature t0 in preferred embodiments described above, the present invention is not restricted to this. When the estimated motor temperature is not obtained and the actual temperature of the electric motor is equal to or higher than the predetermined temperature, the ECU may alternatively be configured or programmed to limit the available current of the electric motor of the electric steering section.

While the outboard motor mounted on the outside of the vessel body is preferably used as a marine propulsion unit in preferred embodiments described above, the present invention is not restricted to this. As a marine propulsion unit, an inboard motor mounted inside the vessel body may alternatively be used, or an inboard-outboard motor (stern drive) provided inside and outside the vessel body may alternatively be used.

While the process operations performed by the ECU 6 (controller) are described using a flowchart in a flow-driven manner in which processes are performed in order along a process flow for the convenience of illustration in preferred embodiments described above, the present invention is not restricted to this. The process operations performed by the controller may alternatively be performed in an event-driven manner in which the processes are performed on an event basis. In this case, the process operations performed by the controller may be performed in a complete event-driven manner or in a combination of an event-driven manner and a flow-driven manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A steering for a marine propulsion unit comprising:
an electric actuator that changes a direction of a thrust force of the marine propulsion unit;
a storage that stores an output region that is set based on a steering speed and a steering torque provided by the electric actuator; and
a controller configured or programmed to:
  acquire a required steering speed and a required steering torque based on a rotation angle of a steering wheel;
  adjust at least one of the required steering speed and the required steering torque such that both the required steering speed and the required steering torque fall within the output region when both the required steering speed and the required steering torque are outside the output region;
  set a target steering angle based on at least one of the required steering speed and the required steering torque that has been adjusted; and
  set the target steering angle based on the rotation angle of the steering wheel when the required steering speed and the required steering torque are within the output region, and to drive and control the electric actuator according to the set target steering angle;
wherein
the controller is configured or programmed to update setting of the target steering angle at a predetermined time interval.

2. The steering for a marine propulsion unit according to claim 1, wherein the controller is configured or programmed not to adjust the required steering torque but to adjust the required steering speed such that the required steering speed and the required steering torque fall within the output region.

3. The steering for a marine propulsion unit according to claim 1, wherein the controller is configured or programmed to adjust both the required steering speed and the required steering torque when the required steering speed and the required steering torque do not fall within the output region even when the required steering speed is adjusted.

4. The steering for a marine propulsion unit according to claim 1, wherein the storage stores a map showing the output region that is set based on the steering speed and the steering torque provided by the electric actuator.

5. The steering for a marine propulsion unit according to claim 4, wherein
the storage stores a plurality of the maps showing a plurality of the output regions that are different from each other; and
the controller is configured or programmed to select one of the plurality of maps according to an available current of the electric actuator.

6. The steering for a marine propulsion unit according to claim 5, wherein
the plurality of maps include a normal map and a correction map in which the output region is corrected such that a maximum value of the steering torque according to the steering speed is smaller than that in the normal map; and
the controller is configured or programmed to select the normal map when the available current of the electric actuator is not limited, and to select the correction map when the available current of the electric actuator is limited.

7. The steering for a marine propulsion unit according to claim 1, wherein the controller is configured or programmed to update the output region based on an available current of the electric actuator.

8. The steering for a marine propulsion unit according to claim 7, wherein the controller is configured or programmed to limit the available current of the electric actuator and update the output region based on the limited available current when a temperature of the electric actuator is equal to or higher than a predetermined temperature.

9. The steering for a marine propulsion unit according to claim 1, wherein the controller is configured or programmed to:
update the setting of the target steering angle according to the adjusted required steering speed and required steering torque in a state in which a degree of increase of the target steering angle at the predetermined time interval is reduced when the required steering speed and the required steering torque are outside the output region.

10. The steering for a marine propulsion unit according to claim 1, wherein the controller is configured or programmed to set the target steering angle such that a degree of increase of the target steering angle is proportional to a degree of change of the rotation angle of the steering wheel when the required steering speed and the required steering torque are within the output region.

* * * * *